(12) United States Patent
van Breemen et al.

(10) Patent No.: US 6,995,022 B1
(45) Date of Patent: Feb. 7, 2006

(54) SCREENING OF XENOBIOTICS AND ENDOGENOUS COMPOUNDS FOR METABOLIC TRANSFORMATION, FORMATION OF TOXIC METABOLITES, AND BIOAVAILABILITY

(75) Inventors: Richard B. van Breemen, Elmhurst, IL (US); Judy L. Bolton, Chicago, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/471,523

(22) Filed: Dec. 23, 1999

Related U.S. Application Data

(63) Continuation of application No. PCT/US99/11493, filed on May 25, 1999.
(60) Provisional application No. 60/086,813, filed on May 26, 1998.

(51) Int. Cl.
  *G01N 27/00* (2006.01)
  *G01N 33/53* (2006.01)

(52) U.S. Cl. .......................... 436/150; 436/149; 435/4; 435/7.1; 435/7.2
(58) Field of Classification Search ................ 530/300, 530/388.1, 333; 435/2, 4, 5.2, 6, 240.7, 7.1, 435/7.2, 245.2, 240.27; 436/536, 149, 150
  See application file for complete search history.

(56) References Cited

U.S. PATENT DOCUMENTS

| | | | |
|---|---|---|---|
| 5,366,862 A | * 11/1994 | Venton et al. | ............... 435/7.1 |
| 5,478,723 A | 12/1995 | Parkinson et al. | ............. 435/4 |
| 5,567,592 A | 10/1996 | Benet et al. | ............... 435/7.21 |
| 5,872,015 A | * 2/1999 | Venton et al. | .............. 436/538 |

OTHER PUBLICATIONS van Breemen et al., "Metabolic Screening Using On–Line Ultrafiltration Mass Spectrometry", Feb. 1998, Drug Metabolism and Disposition, 26(2):85–90.* van Breemen et al., Pulsed Ultrafiltration Mass Spectrometry: A New Method for Screening Combinatorial Libraries, Anal. Chem., Jun. 1, 1997, 69(11): 2159–2164.*

Zhao et al., Screening Solution–Phase Combinatorial Libraries Using Pulsed Ultrafiltration/Electrospray Mass Spectrometry, J. Med. Chem., Dec. 5, 1997, 40(25):4006–4012.*

Wieboldt et al. 1997. Anal Chem 69:1683–1691.*

Stevanovic et al. 1993. Bioorganic & Medicinal Chemistry Letters. 3:431–436.*

Metzger et al. Angew Chem Int Ed Engl. 32:985–896.*

Hidalgo, I.J., et al. (1989) "Characterization of the Human Colon Carcinoma Cell Line (Caco–20) as a Model System For Intestinal Epithelial Permeability," *Gastroenterology* 96: 736–749.

Parkinson, A., et al. (1996) "An Overview of Current Cytochrome P450 Technology for Assessing the Safety and Efficacy of New Materials," *Toxicol Pathol* 24: 45–57.

* cited by examiner

*Primary Examiner*—Andrew Wang
*Assistant Examiner*—My-Chau T Tran
(74) *Attorney, Agent, or Firm*—Barnes & Thornburg LLP; Alice O. Martin

(57) ABSTRACT

A high throughput, on-line, pulsed ultrafiltration-mass spectrometric method has been developed to determine whether a compound has predetermined characteristics that would make it suitable for a specific purpose, e.g. drug development. The method is useful to generate, identify, and quantify metabolites of compounds formed by drug metabolizing enzymes such as cytochrome P450, UDP-glucuronyltransferases, and glutathione transferases. The method is useful for rapid screening of drugs or other compounds to determine the extent of their metabolism and to characterize their primary metabolites. If reactive and potentially toxic metabolites are formed during, e.g. cytochrome P450 oxidation, the metabolites can be reacted with glutathione and then detected on-line using mass spectrometry in a rapid assay to assess the potential for toxicity. In addition, the method is useful for the determination of bioavailability, absorption and cell permeability of compounds.

12 Claims, 12 Drawing Sheets

US 6,995,022 B1

SCREENING OF XENOBIOTICS AND ENDOGENOUS COMPOUNDS FOR METABOLIC TRANSFORMATION, FORMATION OF TOXIC METABOLITES, AND BIOAVAILABILITY

This application claims priority from provisional application 60/086,813 filed May 26, 1998 now abandoned, and is a continuation of PCT/US99/11493 filed May 25, 1999.

This invention relates to a high throughput, on-line, pulsed ultrafiltration method useful for drug development and screening for metabolic parameters, bioactivation and potential toxicity of compounds and molecules, Enzyme assays and bioavailability studies are aspects of the invention.

BACKGROUND OF THE INVENTION

Combinatorial chemistry, a new approach to the identification and optimization of drug leads in medicinal chemistry, has been enormously successful in synthesizing large number of compounds for pharmacological screening and testing (Gordon et al., 19%; Thompson and Ellman, 1996). In response to the large number of new compounds produced, high throughput screening methods are being developed to rapidly identify lead compounds in combinatorial libraries that interact with specific receptors, or show desirable pharmacological effects in bioassays (Loo, 1997). As the number of lead compounds being identified through combinatorial methods increases substantially, preclinical investigations such as the investigation of drug metabolism and toxicity become the new bottleneck to the process of bringing new drugs to market.

Traditionally, live animals or perfused liver or gut preparations have been used during the preclinical investigation of metabolism and toxicity of drugs and other xenobiotic compounds. In an effort to reduce costs, to reduce the number of animals used, and to gain insights into toxicological pathways, in vitro assays have been developed to study drug metabolism using hepatic microsomes, reconstituted purified isozymes, primary culture hepatocytes, tissue slices, and cytochrome P450 overexpressed in whole cells (Parkinson, 1996; Maurel, 1996). However, these in vitro assays lack sufficient throughput to keep pace with the large number of lead compounds being identified through combinatorial chemistry drug discovery programs. The fastest current method to assess drug metabolism utilizes hepatic microsomes, which are incubated in a test tube with a drug and the cofactor NADPH. After at least 10 minutes, the solution is extracted (5–30 min), the extract may be concentrated (0–60 min), then the extract is analyzed using HPLC, GC, LC-MS or GC-MS (10–60 min). Therefore, the fastest current method requires from 35–170 min, depending upon the sample handling and analysis procedures. There is a need to streamline (reduce the number of separate steps, reduce the sample handling requirements, and integrate the process into a faster, simpler and automated assay) and increase the throughput of existing in vitro metabolism assays. In addition, no method exists to readily measure the intrinsic bioavailability of a compound, in particular on a large scale, high throughput basis. Pulsed ultrafiltration mass spectrometry was applied to metabolic screening of xenobiotic compounds by the inventors (Van Breemen et al. 1998).

SUMMARY OF THE INVENTION

The present invention provides a method of determining whether a compound has predetermined characteristics that make it a candidate for drug development or a substrate for a particular enzyme. The method is a novel, high-throughput, on-line analysis of compounds added to a continuous flow system through biological materials in solution-that interact with the compounds. "High-throughput" is defined herein to be of the order of 1 metabolite (compound) processed per minute.

Results of the biological interactions are separated for analysis by an ultrafiltration membrane. This method is useful for characterization of, e.g. enzyme reactions and the determination of the bioavailability of xenobiotic' compounds.[1]

The method of the present invention for determining whether a compound from a sample has predetermined characteristics includes placing a biological material in a first solution or suspension; maintaining a continuous flow of a supportive solution through the first solution or suspension; adding the sample to the continuous flow of the supportive solution; providing suitable conditions for the interaction of the biological material in the first solution or suspension with the compound in the sample; washing the results of the interaction between the biological material in the first solution or suspension and the compound in the sample through an ultrafiltration membrane to form a second solution; and analyzing the second solution to determine whether the compound in the sample had the predetermined characteristics.

The biological sample includes a protein, a peptide, an oligonucleotide, an oligosaccharide, a microsome, a cell, a tissue, an enzyme, a receptor, DNA and RNA.

The compound is generally a candidate for drug development produced by combinatorial chemistry or a natural product.

The supportive solution includes a buffer, a nutrient medium, or a combination thereof. The supportive solution is capable of maintaining the biological material in a state wherein the biological material can interact with a compound in the sample.

The continuous flow facilitates the interaction of the compound(s) with the biological material and then facilitates the removal of the compounds and metabolites thereof by washing them through the ultrafiltration membrane and into the second solution for analysis.

The predetermined characteristics of a compound to be analyzed include functioning as substrate for an enzyme in the biological material, showing desirable rates of enzyme catalysis, showing desirable rates of cell membrane permeability or transport, or showing activation to reactive or toxic metabolites.

The sample is added to the continuous flow by means of injection or infusion.

The suitable conditions for interaction of the biological material in the first solution with the compound in the sample include mixing the sample with the biological material to achieve a homogeneous distribution, controlling temperature to maintain function of the biological material, providing adequate sample concentration and a sufficient amount of biological material to facilitate analysis, allowing sufficient time for interaction, and controlling atmospheric gases to maintain function of biological material.

The ultrafiltration membrane pore sizes allow the sample to pass through but not the biological material.

The analyzing of the second solution is generally by mass spectrometry, UV spectrophotometer, electrochemistry, IR, radioactivity, fluorescence spectrophotometry or NMR.

A kit for analyzing compounds in a sample includes, in separate containers, an ultrafiltration membrane, a first solution containing a biological material, a buffer, a test solution, a set of standard solutions with predetermined characteristics and a receptacle for the second solution that results from interactions of the compounds with the biological material.

The high throughput, on-line, ultrafiltration-mass spectrometric method is useful to generate, identify, and quantify metabolites of compounds formed by drug metabolizing enzymes such as cytochrome P450, UDP-glucuronyltransferases, and glutathione transferases. This method, designated pulsed ultrafiltration-mass spectrometry, may be used for rapid screening of drugs or other compounds to determine the extent of their metabolism and to characterize their primary metabolites. If reactive and potentially toxic metabolites are formed during reactions, e.g. cytochrome P450 oxidation, the metabolites can be reacted with glutathione and then detected on-line using mass spectrometry in a rapid assay to assess the potential for toxicity. In addition, the method is useful for the determination of the inherent bioavailability of xenobiotic compounds.

A. Mass spectrometric analysis performed for 2 minutes, of effluent from the parallel control incubation (containing NADPH and inactive microsomes) showed no metabolites of imipramine.

B. The ultrafiltration chamber contained rat liver microsomes; imipramine and NADPH were coinjected through the chamber; and on-line mass spectrometric detection was used for only 2 minutes. Metabolism of imipramine by rat liver microsomes was demonstrated by the appearance of protonated monoxygenated imipramine at m/z 297 (mass spectrometer detector response for a protonated molecule weighing 297 mass units).

Figure 6:
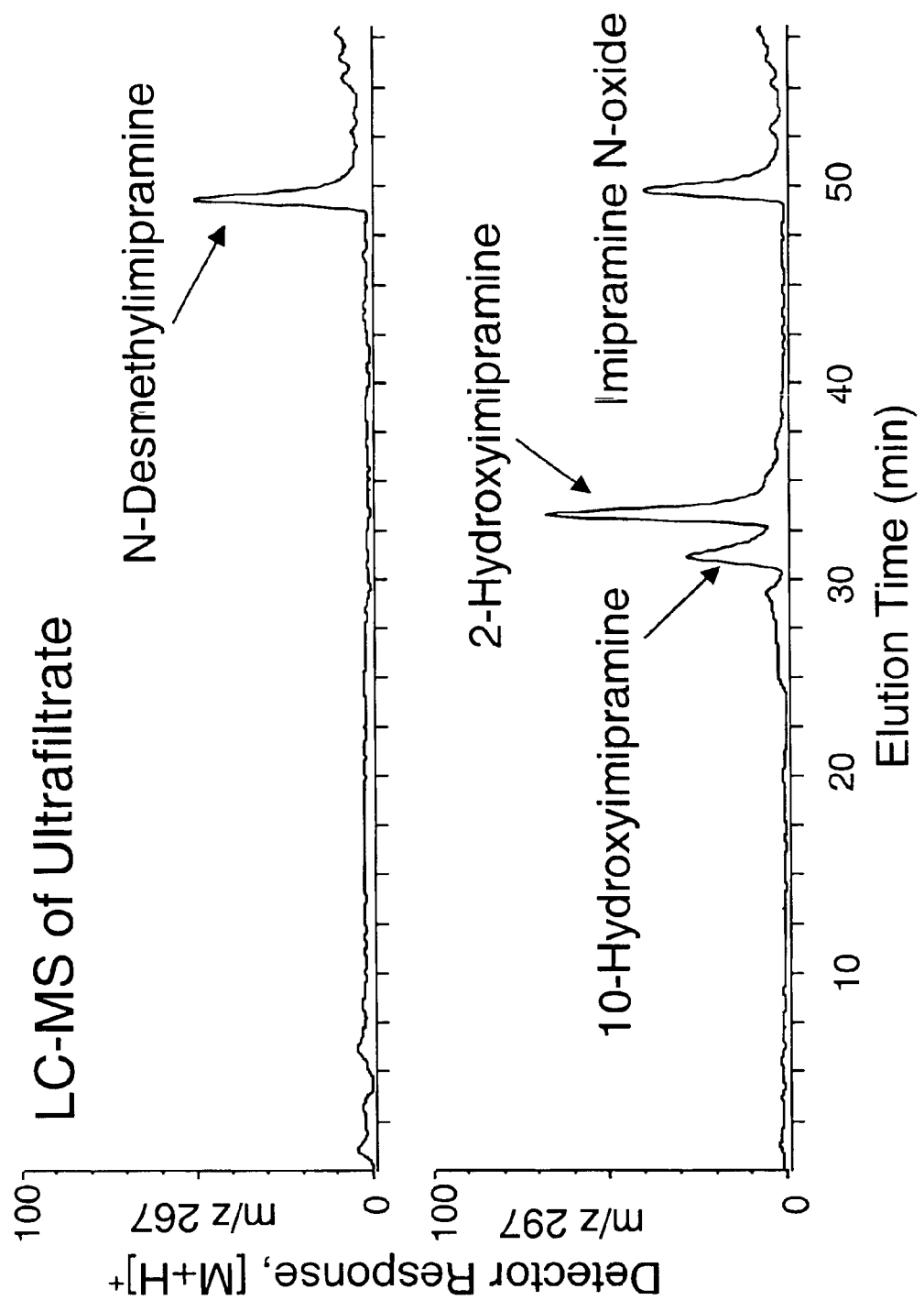

FIG. 6 shows computer-reconstructed mass chromatograms of the positive ion electrospray reversed phase LC-MS (liquid chromatography-mass spectrometry) analyses of the major imipramine metabolites, which were formed by 1) incubation of imipramine with rat liver cytochromes P450 during pulsed ultrafiltration, 2) collection of the effluent containing the metabolites, and 3) reinjection onto the LC-MS. Tandem mass spectra of each of the isomeric peaks of m/z 297 are summarized in Table 1.

Figure 7:
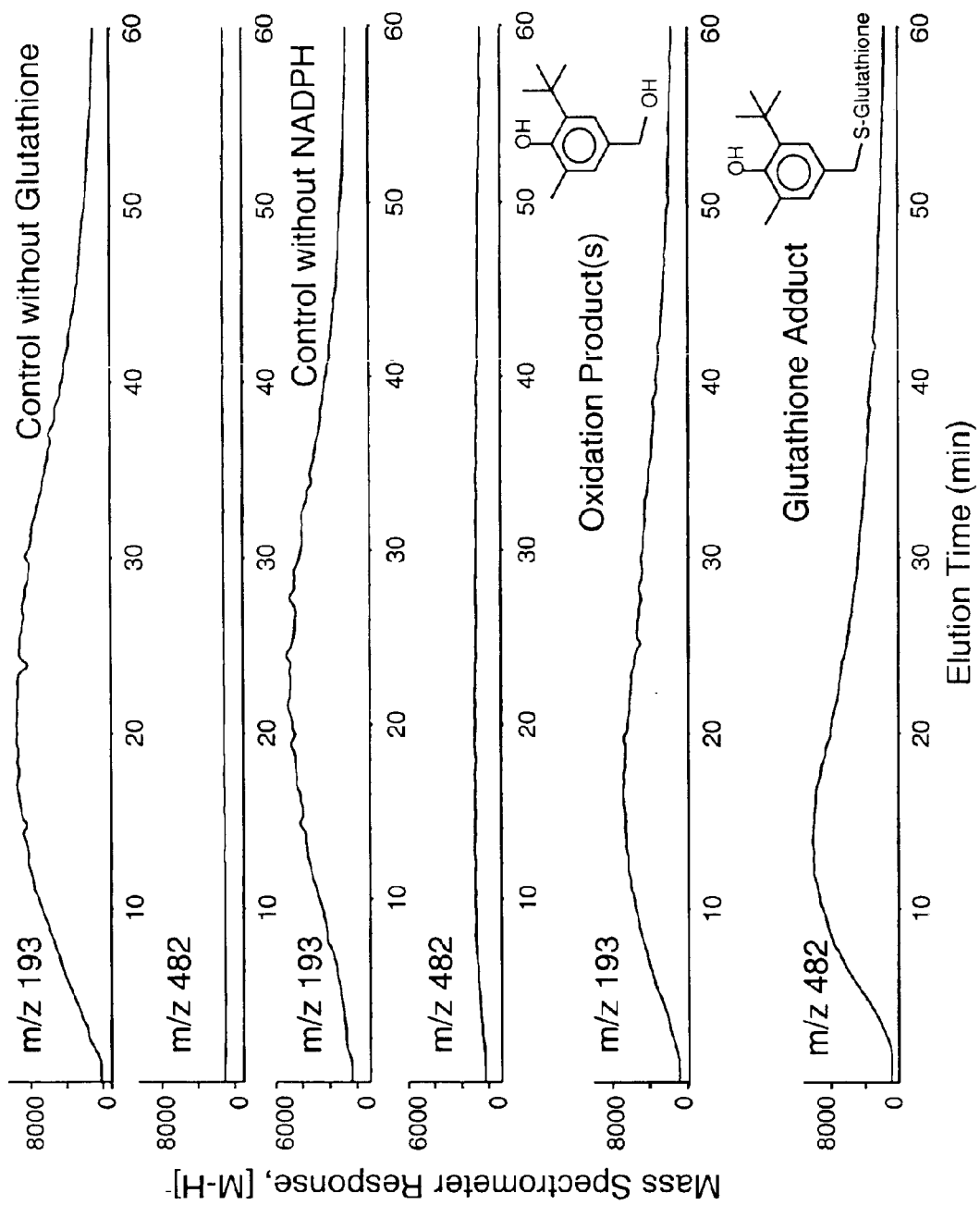

FIG. 7 shows results of screening for formation of glutathione adducts as indicators of toxic (electrophilic) metabolites using pulsed ultrafiltration-mass spectrometry. In this example, the chamber was loaded with rat liver microsomes (1 mg/mL protein) containing cytochromes P450 and microsomal glutathione S-transferase. The substrate, butyldimethyl phenol was injected along With NADPH and glutathione as cofactors. The formation of metabolites was monitored by using negative ion electrospray mass spectrometry. (A type of mass spectrometry compatible with samples in solution; electrospray serves as the interface between the solution phase sample and gas phase sample ion, which is measured by the mass spectrometer.) Oxidation of butyldimethyl phenol by cytochromes P450 produced a reactive quinone methide intermediate which either reacted with water to form the oxidation product detected at m/z 193, or reacted with glutathione to form the adduct detected at m/z 482. As expected, glutathione adducts were observed only in experiments containing both glutathione and NADPH.

Figure 8:
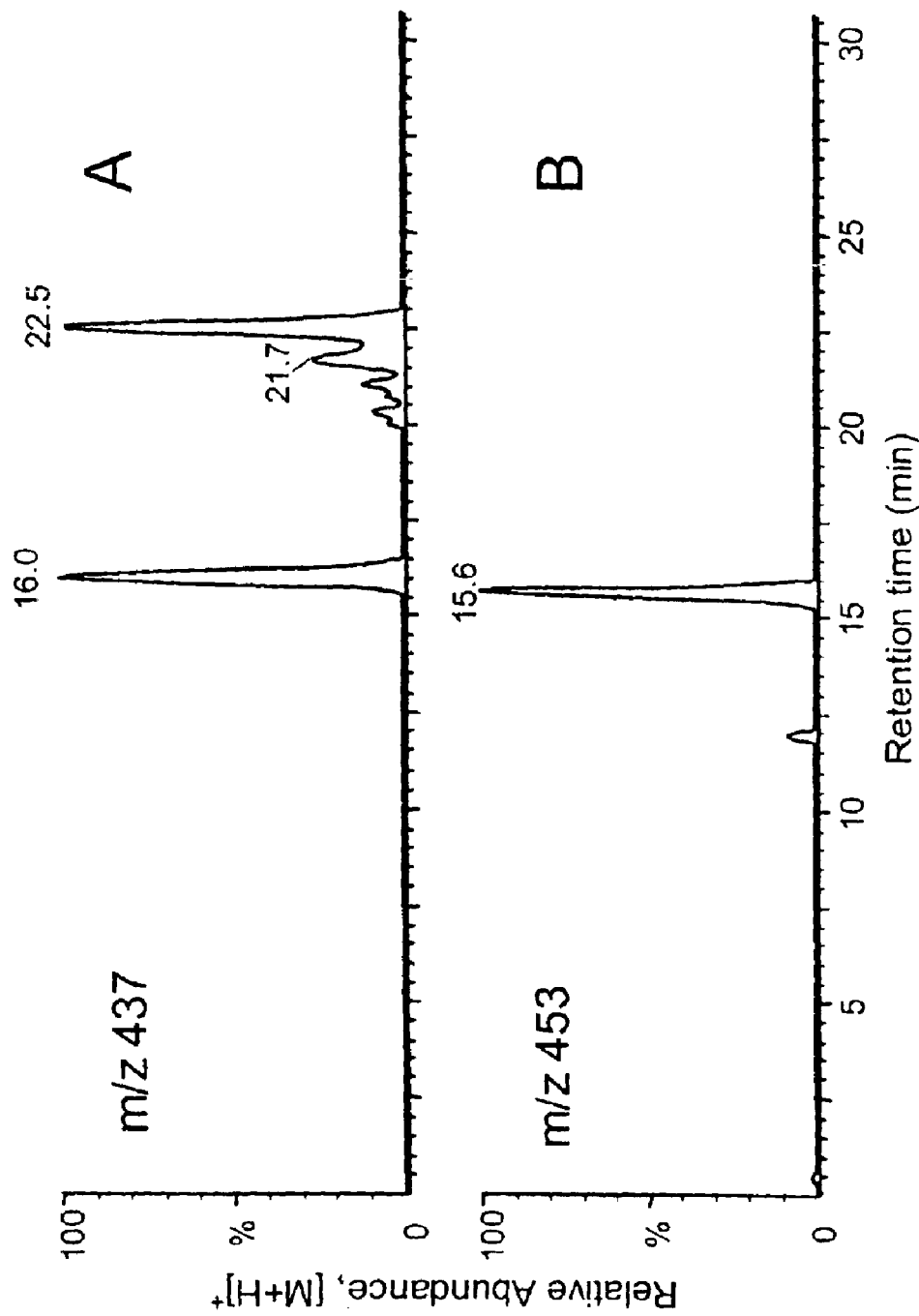

FIG. 8 illustrates constant neutral loss LC-MS-MS analysis of the glutathione adducts of 3-methylindole formed during pulsed ultrafiltration toxicity screening. In addition to the three isomeric glutathione ducts detected at m/z 437(A), an additional product was observed at m/z 453 indicating monooxygenation as well as conjugation with glutathione (B).

Figure 9:
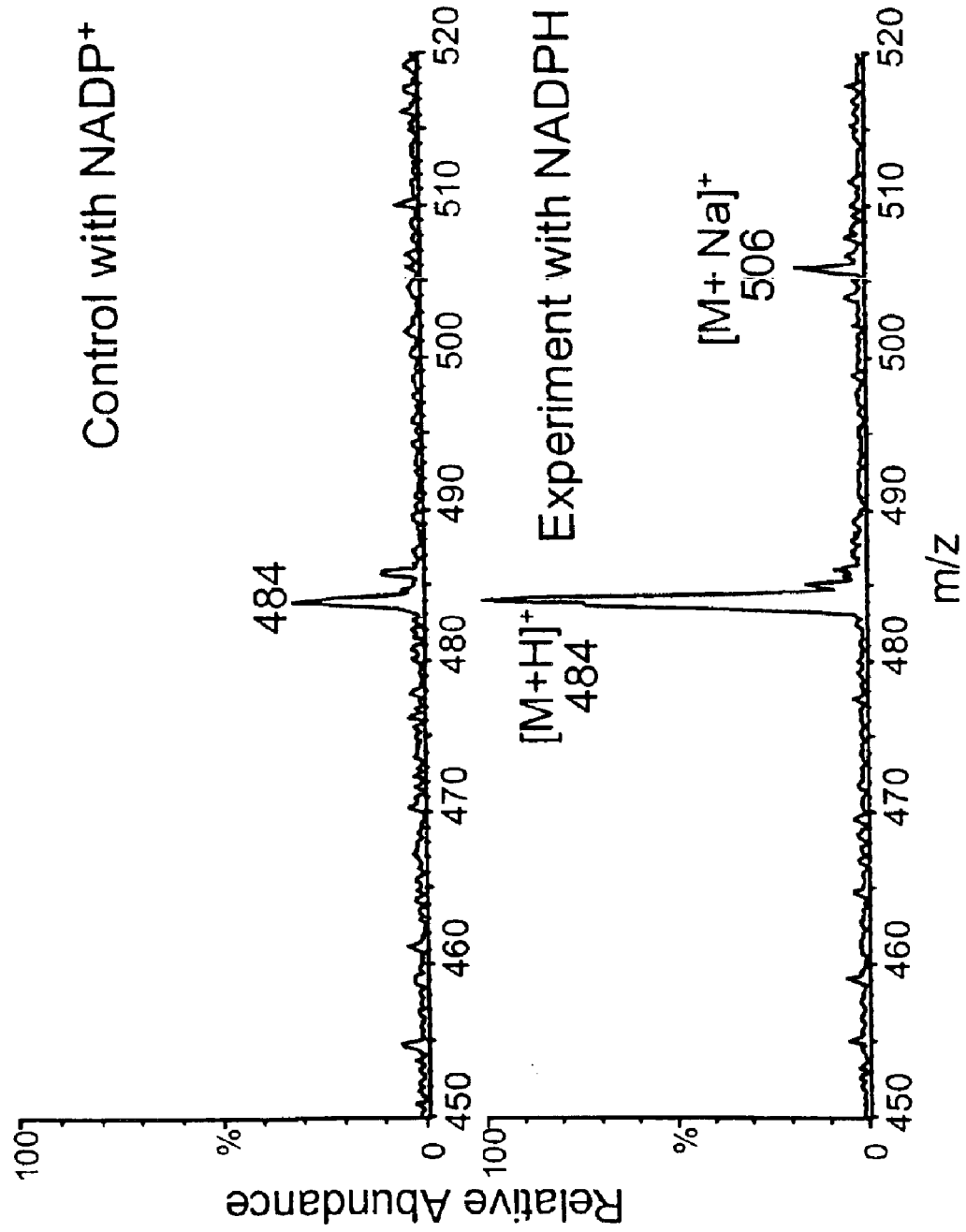

FIG. 9 illustrates constant neutral loss tandem mass spectrum obtained in 1 min using on-line pulsed ultrafiltration-MS-MS showing the detection of a butyldimethyl phenol-glutathione adduct; in this high throughput analysis, glutathione adducts are selectively detected by the elimination of the gamma-glutamyl group weighing. 129 Daltons; background ions corresponding to unreacted butyldimethyl phenol, NADPH, buffer and contaminants are eliminated by the quadrupole mass filters during this MS-MS analysis because they do not fragment to eliminate the characteristic glutathione group weighing 129 Daltons.

Figure 10:
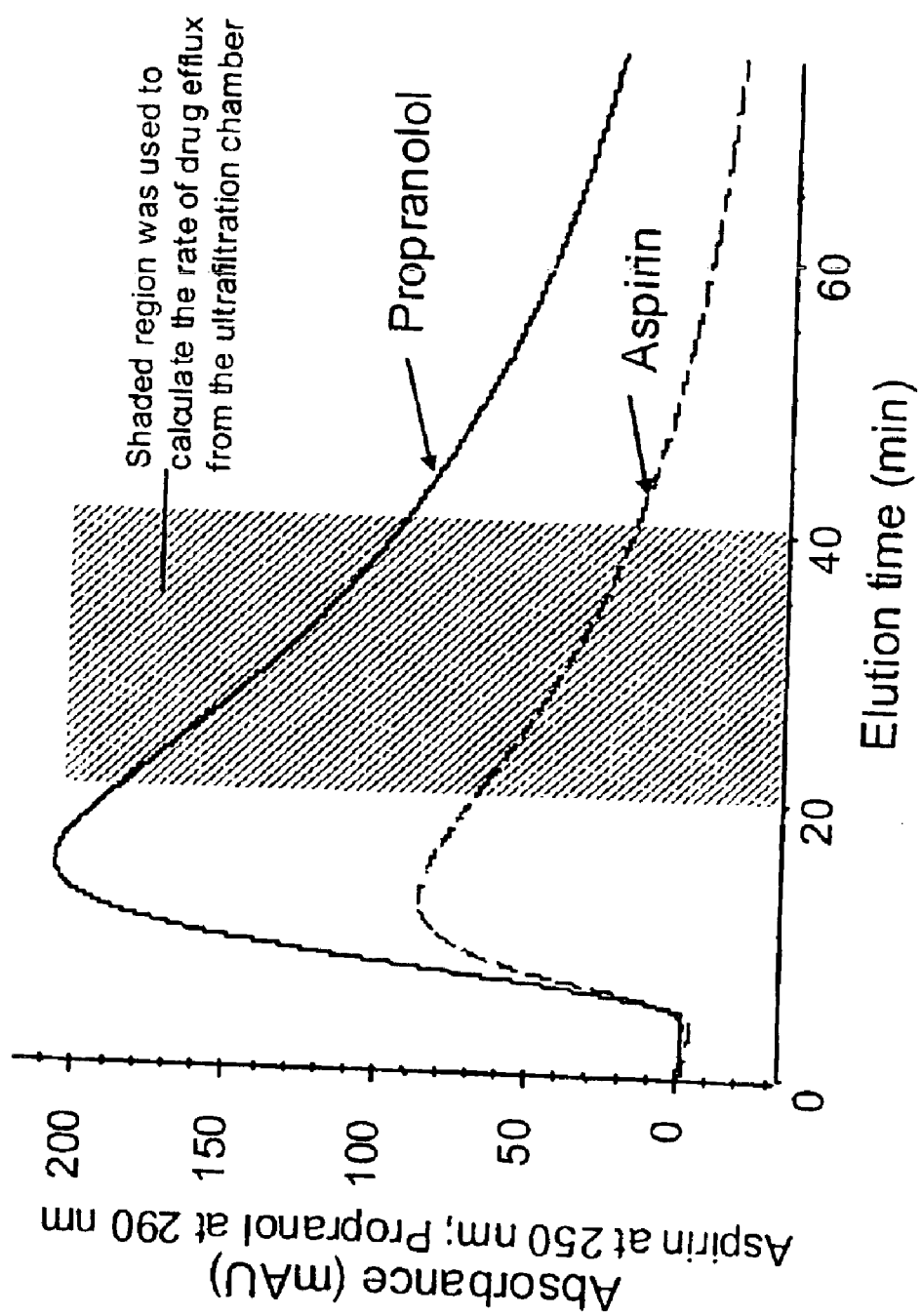

FIG. 10 shows elution profiles for propranolol and aspirin during a pulsed ultrafiltration assay to determine their relative permeability to intestinal epithelial Caco-2 cells. The permeability of intestinal epithelial cells is a fundamental factor that determines the absorption of compounds from the gut and affects their bioavailability; data in the shaded area of the elution curve were used to calculate the relative elution rates shown in FIG. 11.

Figure 11:
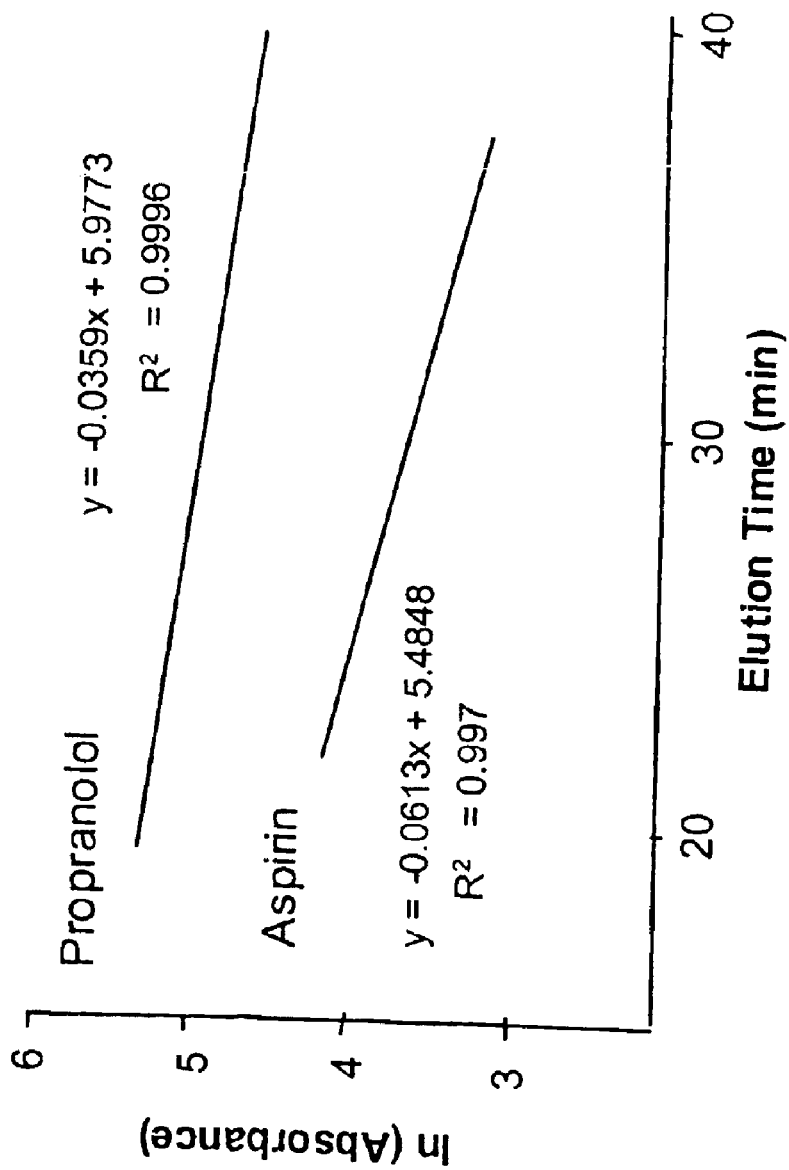

FIG. 11 shows elution rates of propranolol and aspirin from the ultrafiltration chamber containing Caco-2 cells; the data used to generate this plot were obtained from the shaded area of the elution curves shown in FIG. 10.

DETAILED DESCRIPTION OF THE INVENTION

A high throughput, on-line, pulsed ultrafiltration-mass spectrometric method has been developed to determine whether a compound has predetermined characteristics that would make it suitable for a specific purpose, e.g. drug development. The method is used to generate, identify, and quantify metabolites of compounds formed by drug metabolizing enzymes such as cytochrome P450, UDP-glucuronyltransferases, and glutathione transferases. The method is useful for rapid screening of drugs or other compounds to determine the extent of their metabolism and to characterize their primary metabolites. If reactive and potentially toxic metabolites are formed during, e.g. cytochrome P450 oxidation, the metabolites can be reacted with glutathione and then detected on-line using mass spectrometry in a rapid assay to assess the potential for toxicity. In addition, rates of cellular uptake, absorption and permeability may be measured using pulsed ultrafiltration as a measure of bioavailability.

Biological material such as enzymes responsible for metabolism of drugs and other xenobiotic compounds is in a first solution in a first chamber (an "ultrafiltration chamber") that permits low molecular weight compounds such as drugs and their metabolites to pass through a membrane to a second chamber, but does not allow the higher molecular weight enzymes to pass through. The biological material includes enzymes which may consist of single, purified enzymes or mixtures of enzymes. Alternatively, the enzymes may be contained in microsomal preparations such as liver microsomes, tissue homogenates or intact, living cells such as hepatocytes. The enzymes may include soluble enzymes such as proteases or glutathione transferases, microsomal enzymes such as cytochromes P450 or UDP-glucuronyl transferases, or enzymes contained in intact cells. Instead of enzymes, the first chamber may contain intact cells or membrane preparations for the study of drug uptake, transport, absorption and bioavailability. The pore size of the membrane can, however, be closer to retain molecules of whatever molecular weight that is suitable for a particular application. A continuous flow of supportive solution such as a buffer and/or nutrient media passes through the first chamber. A sample with a compound (or molecule(s) or a mixture of compounds) to be tested is joined with the continuous stream of a supportive solution, as a pulse. Preferably the sample to be tested is injected into the stream to interact with the biological material in the first solution.

The results of the interaction subsequently flow through an ultrafiltration membrane to the analyzer. The pore sizes of the membrane are selected based on the size of the predetermined resulting compounds or molecules and biological material. Pore sizes may range from those allowing only very low molecular weight products to pass through, e.g. acetone or benzene (50–100D) to larger molecules in the 12,000–20,000D range e.g. enzymes, myoglobin, to very large molecules (100,000-million D). The pore size must be small enough to prevent the biological material from passing through, e.g. a 10,000 molecular weight cut-off pore size prevents adenosine deaminase from passing through and a 100,000 molecular weight cut-off membrane prevents microsomes from passing through. A preferred analyzer is a mass spectrometer. Other suitable analyzers are UV-spectrophotometers, fluorescence spectrophotometers, electrochemical detectors, NMR spectrometers, radioactivity monitors, and IR spectrophotometers.

A continuous-flow of a buffer (usually a volatile buffer such as ammonium acetate at physiological pH) is pumped through the ultrafiltration chamber and into an electrospray mass spectrometer detector (or other suitable LC-MS or LC-MS-MS instrument).

In an embodiment, the metabolism of xenobiotic compounds such as drugs is investigated by flow-injecting an aliquot of the compound (or mixture of xenobiotic compounds) through the first ultrafiltration chamber containing the trapped enzymes and then detecting the metabolites as they elute from the chamber using on-line electrospray mass spectrometry. Preferably, the solutions in the first chamber are stirred. Any necessary cofactors, such as NADPH (for cytochrome P-450 oxidation), UDPGA for glucuronyl transferase, or glutathione for glutathione transferase, are either included in the continuous phase or co-injected with the xenobiotic substrate. Electrospray mass spectrometric detection facilitates 1) the determination of whether metabolites of the xenobiotic compound (or compound mixture) are formed by a particular enzyme preparation, 2) the determination of the molecular weight of each metabolite, and 3) quantitation of each metabolite and unchanged substrate. Measurement of the rate of disappearance of the substrate provides a measure of how extensively one compound is metabolized compared to another, which is an important consideration during drug development. Tandem mass spectrometry may be used to confirm structures of metabolites, and if isomers of metabolites are formed (such as mixtures of monooxygenated metabolites with identical molecular weights), then an aliquot of the effluent from the ultrafiltration chamber may be analyzed using LC-MS-MS to separate each isomer and then obtain its tandem mass spectrum for identification.

An advantage of this on-line (that is continuous and direct analysis of the solution flowing out of the ultrafiltration chamber) metabolism-mass spectrometric detection system is the ability to detect and identify metabolites just seconds after they are formed. Because so little time elapses and no sample manipulation is necessary, some reactive (and potentially toxic) metabolites that might not be identified using previous methods might be observed directly before they decompose. As discussed in the background, the fastest existing methods known to the inventors for generating metabolites, extracting them from the biological material and then analyzing them, requires from 35–170 min. In contrast, using a 1 mL volume ultrafiltration chamber and a flow rate of 100 µL/min, metabolites may be detected on-line in less than 10 min. by use of the present invention. Using higher flow rates and/or smaller chambers, the time between metabolite formation and detection may be shortened even more to less than 1 min for a 100 µL chamber. Alternatively, reactive metabolites may be trapped by reaction with nucleophiles such as N-acetyl cysteine or as phase II (reaction with conjugating enzymes such as glutathione-S-transferase, UDP-glucuronyl transferases, or sulfo transferases) conjugates such as glutathione adducts. The on-line pulsed ultrafiltration-mass spectrometric observation of reactive metabolites or glutathione adducts formed from reactive metabolites indicates that a particular substrate forms potentially toxic metabolites. In this manner, this assay system may be used for toxicity screening of drugs and other compounds.

High throughput bioavailability measurements are carried out using, for example, live epithelial cells as the biological material in the ultrafiltration chamber. For example, absorption from the human intestine may be predicted using human intestinal epithelial (Caco-2) cells. Xenobiotic compounds (either individually or as mixtures) are injected through the ultrafiltration chamber and their elution profiles are recorded using mass spectrometric detection. Compounds that are excluded from entering the cells elute from the chamber first, and compounds that easily diffuse into, or are actively transported into, the cells have a larger volume of distribution and elute later. Bioavailability correlates inversely with elution time, and the most bioavailable compounds are those that elute last. Because each pulsed ultrafiltration mass spectrometric determination of bioavailability requires approximately 1 hr, and mixtures of compounds may be measured simultaneously, this approach is much faster than previous methods that may require approximately one day each to complete. Another advantage of this approach over standard Caco-2 assays is that no radiolabeled compounds are required.

Ultrafiltration mass spectrometry may be used for the analysis of one compound or one mixture of compounds at a time per ultrafiltration chamber. However, higher throughput ultrafiltration mass spectrometric metabolic and toxicity screening may be carried out using multiple ultrafiltration chambers (e.g. up to 60 at a time) arranged in parallel with a single mass spectrometer. [FIG. 2] By connecting each ultrafiltration chamber on-line to the mass spectrometer for only 1 minute, efficient use of the mass spectrometric detector may be obtained with a throughput of up to 60 ultrafiltration experiments per hour. The compounds that may be screened include drugs, drug candidates, combinatorial libraries, natural products, pesticides, herbicides, other xenobiotic compounds and endogenous biological compounds. On-line ultrafiltration electrospray mass spectrometry offers a streamlined, high-throughput method for in vitro formation and mass spectrometric characterization of drug metabolites.

Figure 1A:
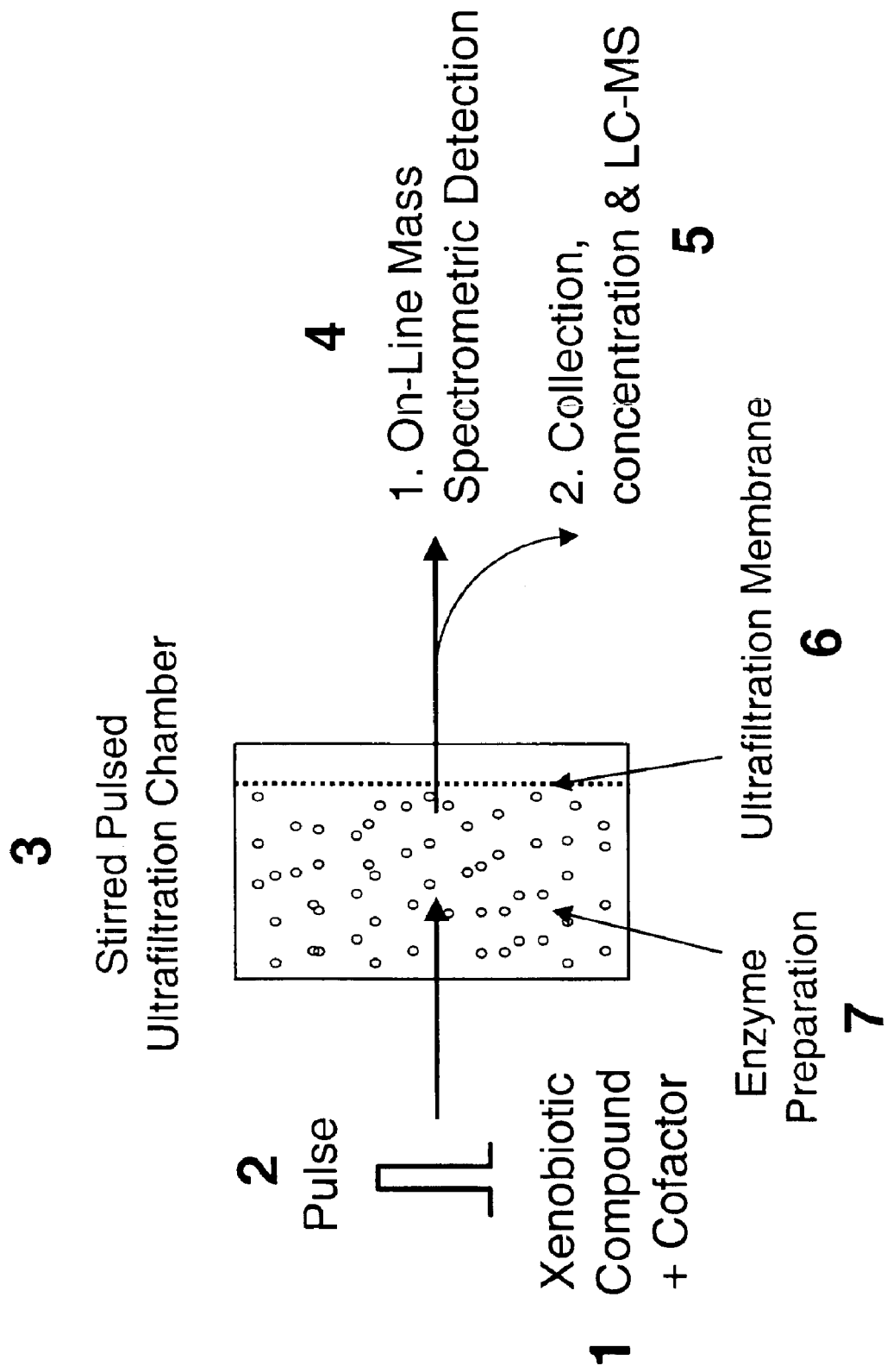
FIG. 1A is a diagrammatic representation of pulsed ultrafiltration-mass spectrometric on-line screening for metabolism and toxicity or bioavailability of a compound.
Figure 1B:
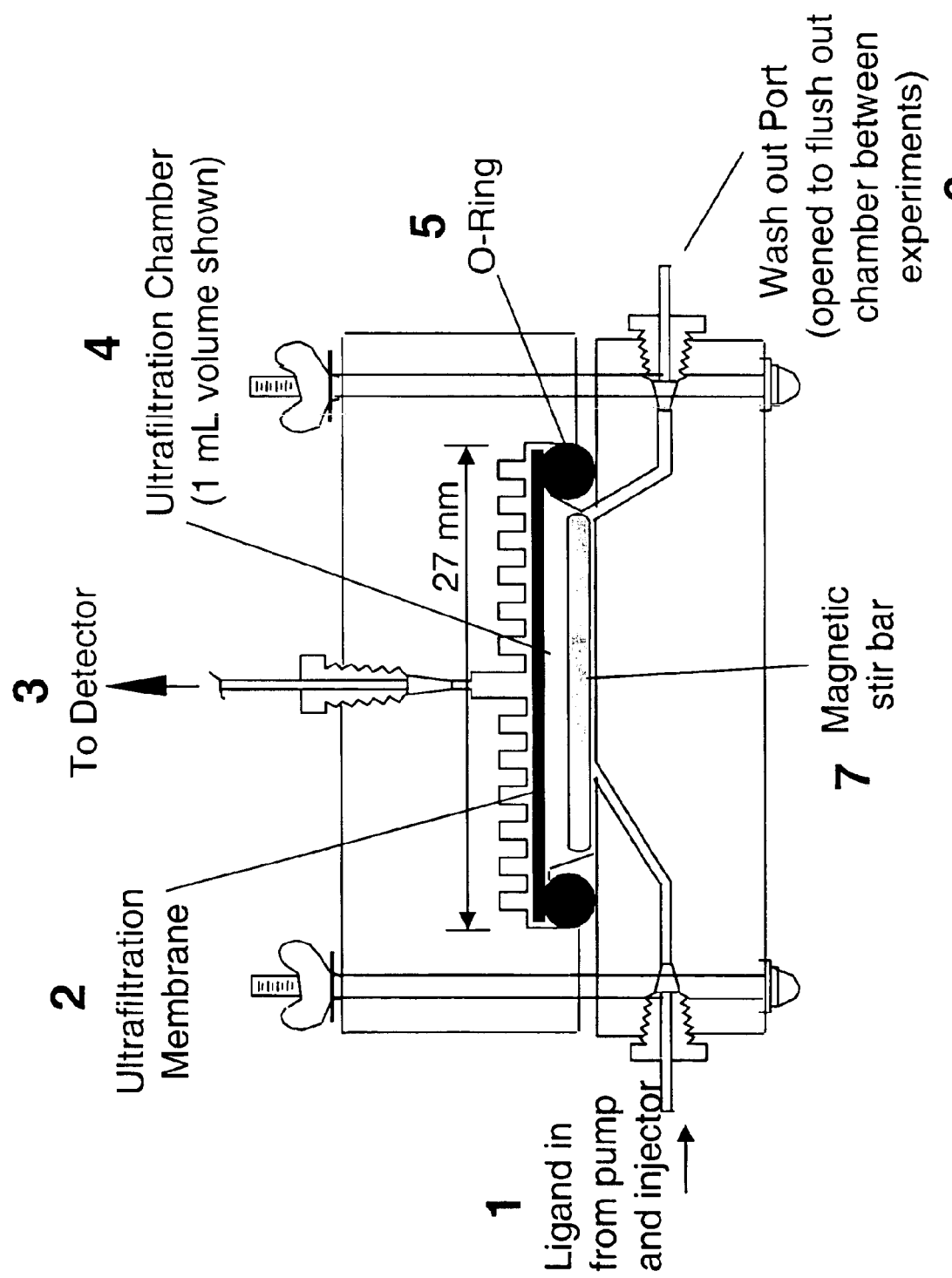
FIG. 1B is a diagrammatic representation of a stirred pulsed ultrafiltration chamber.

A scheme of pulsed ultrafiltration-mass spectrometric screening for metabolism and toxicity or bioavailability is shown in diagrammatic form in FIG. 1A. A compound (or mixture of compounds) 1 is flow-injected 2 into an ultrafiltration chamber 3 containing, e.g. an enzyme, enzyme mixture or cells 7. Any necessary cofactors, such as NADPH, UDPGA, glutathione, etc., are injected along with the compound(s) 1 or added to the continuously flowing buffer solution. Cofactors and cellular nutrients that are essential for cell viability must be continuously introduced to the ultrafiltration chamber. However cofactors such as NADPH or UDPGA that are only needed for enzymatic activity may be co-injected with the-compound(s) 1 under study. Co-injection with the compound(s) 1 is the most economical approach. The enzymes which are too large to pass through the ultrafiltration membrane, may be in pure form or contained in microsomes, tissue homogenate, or living cells. Similarly, the living cells used for bioavailability measurements cannot pass through the ultrafiltration membrane. Metabolites formed in the ultrafiltration chamber are washed out by the buffer solution being pumped through the ultrafiltration membrane and are detected by the on-line electrospray mass spectrometer 4. Unchanged compound(s) 1 may be washed out into the detector and measured during bioavailability studies or quantitative metabolism studies. For additional characterization of metabolite mixtures, part of the effluent from the chamber may be collected for LC-MS or LC-MS-MS analysis 5. As stated elsewhere herein, bioavailability measurements may be carried out by using living cells such as Caco-2 intestinal epithelial cells in the ultrafiltration chamber. FIG. 1B shows details of a stirred pulse ultrafiltration chamber.

Figure 2:
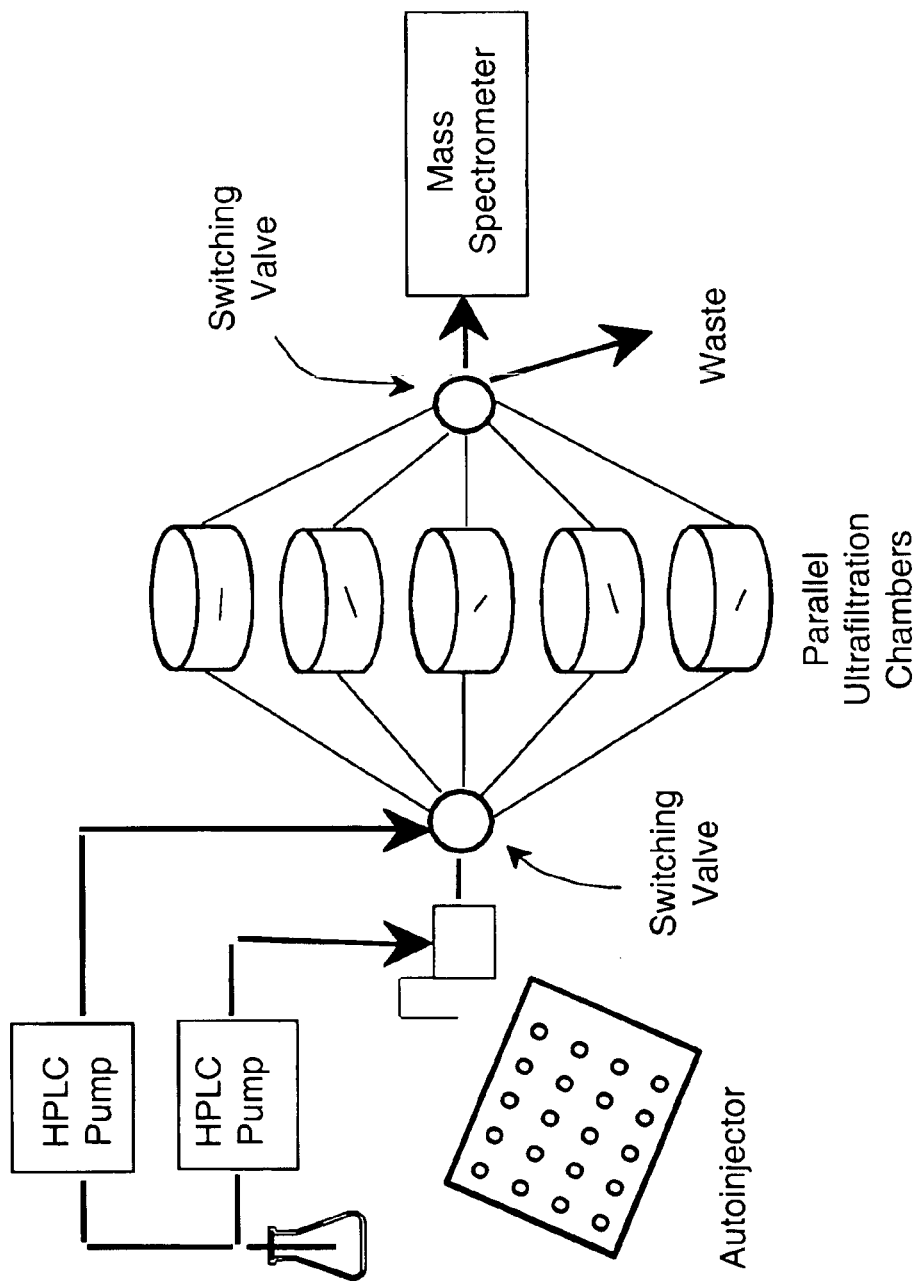
FIG. 2 is a diagrammatic representation of a high throughput pulsed ultrafiltration-mass spectrometry system to screen xenobiotic compounds for products of drug metabolism.

A diagrammatic representation for a high throughput pulsed ultrafiltration-mass spectrometry system to screen xenobiotic compounds for drug metabolism is shown in FIG. 2. Multiple ultrafiltration chambers 13 are connected in parallel 12 to a single mass spectrometer detector 15. After loading each chamber with drug metabolizing enzymes or cells 1 a different xenobiotic compound or mixture is injected into each chamber at intervals of e.g. 1 min. (for 60 screens per hour using 60 chambers) or 3 min. (for 20 screens per hour using 20 chambers). Constant flow of incubation buffer is maintained through all chambers by HPLC pumps 10, but only one chamber at a time is connected 16 to the mass spectrometer 15. Metabolite profiles are obtained by recording mass spectra over a period of up to, e.g. 1 min. (if screening 60 samples per hour, or up to three minutes (20 samples per hour) when the maximum concentration of metabolites is eluting (approximately 20–30 min after the xenobiotic compound is injected). Waste 14 is discarded.

Figure 3:
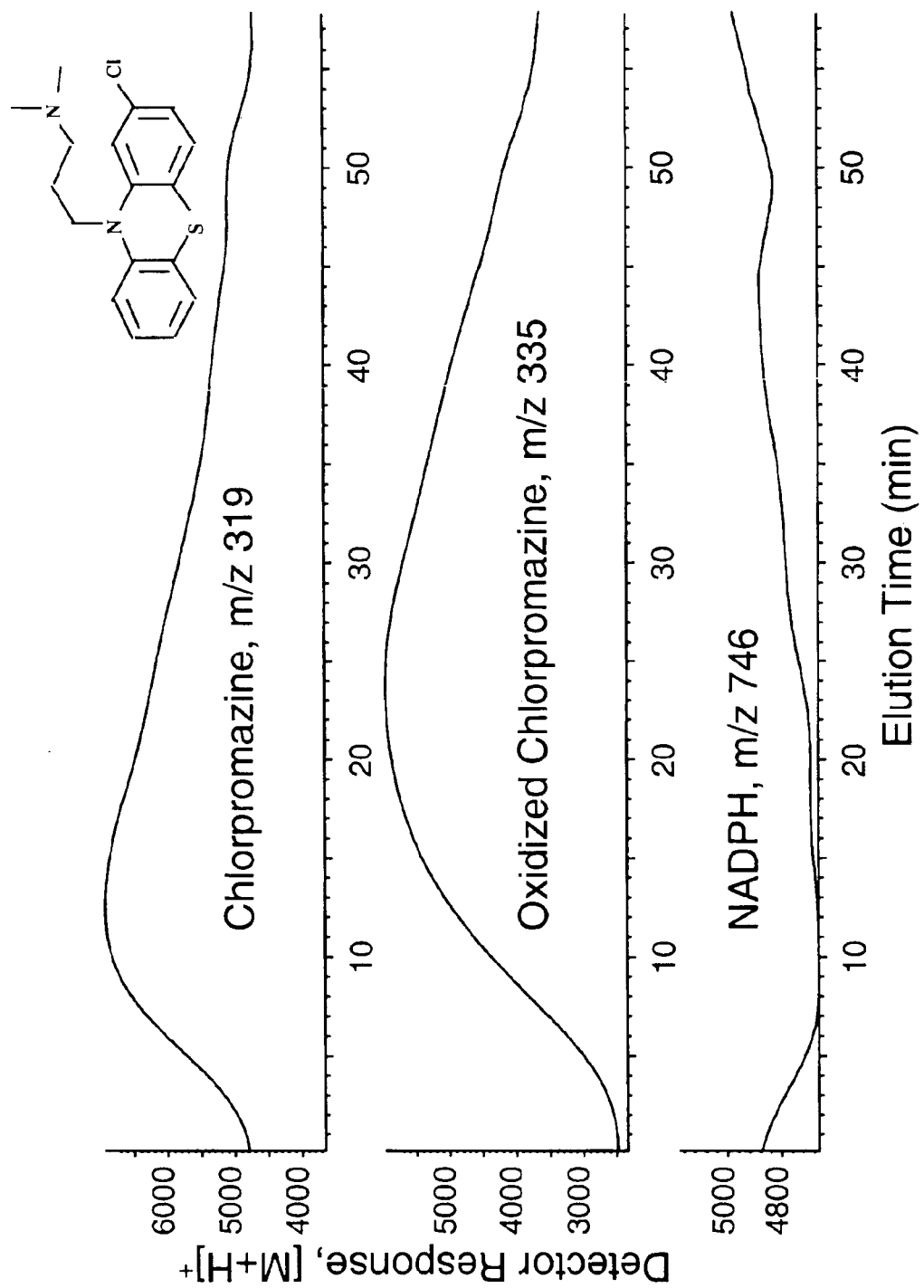
FIG. 3 shows results of an on-line pulsed ultrafiltration positive ion electrospray mass spectrometric analysis of chlorpromazine oxidation by rat liver microsomal cytochromes P450. Chlorpromazine (3 μg, molecular structure shown) was injected into an ultrafiltration chamber containing uninduced rat liver microsomes. NADPH was added to the continuous flow.

Results of on-line pulsed ultrafiltration positive ion electrospray mass spectrometric analysis of chlorpromazine oxidation by rat liver microsomal cytochromes P450 is shown in FIG. 3. Chlorpromazine (3 $\mu$g, molecular structure shown) was injected into an ultrafiltration chamber containing uninduced rat liver microsomes. NADPH was added to the mobile phase. This experiment demonstrates that drug metabolism by microsomal cytochromes P450 may be investigated directly using on-line ultrafiltration mass spectrometry without the need for sample extraction or chromatography. Quantitative analysis of the extent of drug metabolism may be carried out by measuring consumption of NADPH or sample, chlorpromazine.

Figure 4:
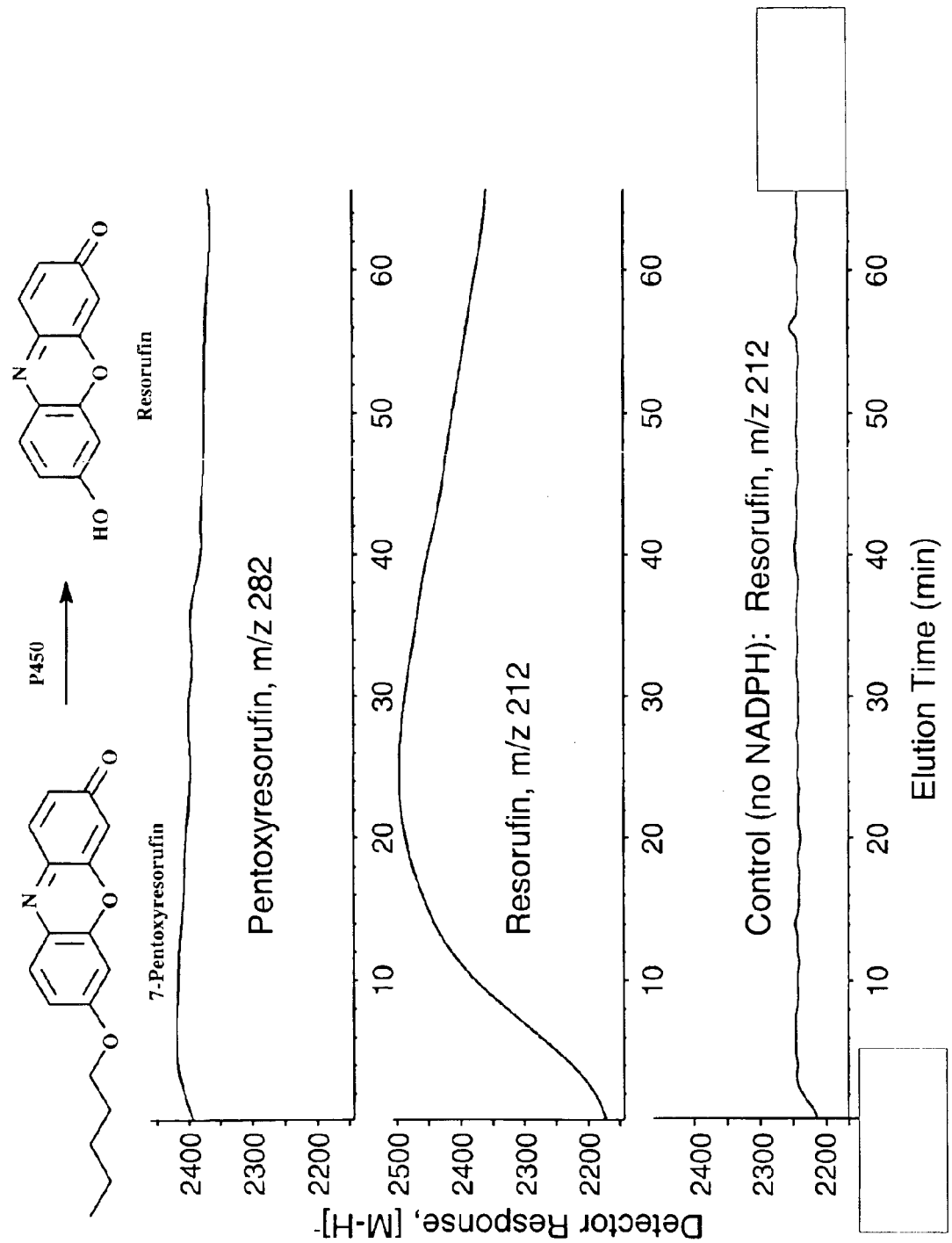
FIG. 4 shows results of pulsed ultrafiltration mass spectrometric analysis of the O-dealkylation of pentoxyresorufin (molecular structure shown) by uninduced rat liver microsomes. The deprotonated molecules of pentoxyresorufin and the metabolite resorufin (modular structure shown), were monitored on-line using negative ion electrospray. The control experiment was identical except that no NADPH was present.

Results of pulsed ultrafiltration mass spectrometric analysis of the O-dealkylation of pentoxyresorufin by uninduced rat liver microsomes is shown in FIG. 4. In this experiment, the cofactor NADPH was coinjected along with the sample pentoxyresorufin. The deprotonated molecules of pentoxyresorufin and the metabolite, resorufin (molecular structure shown), were monitored on-line using negative ion electrospray. The control experiment was identical except that no NADPH was present. This experiment demonstrates that cofactors such as NADPH may be co-injected with the sample instead of being added continuously in the mobile phase.

Figure 5:
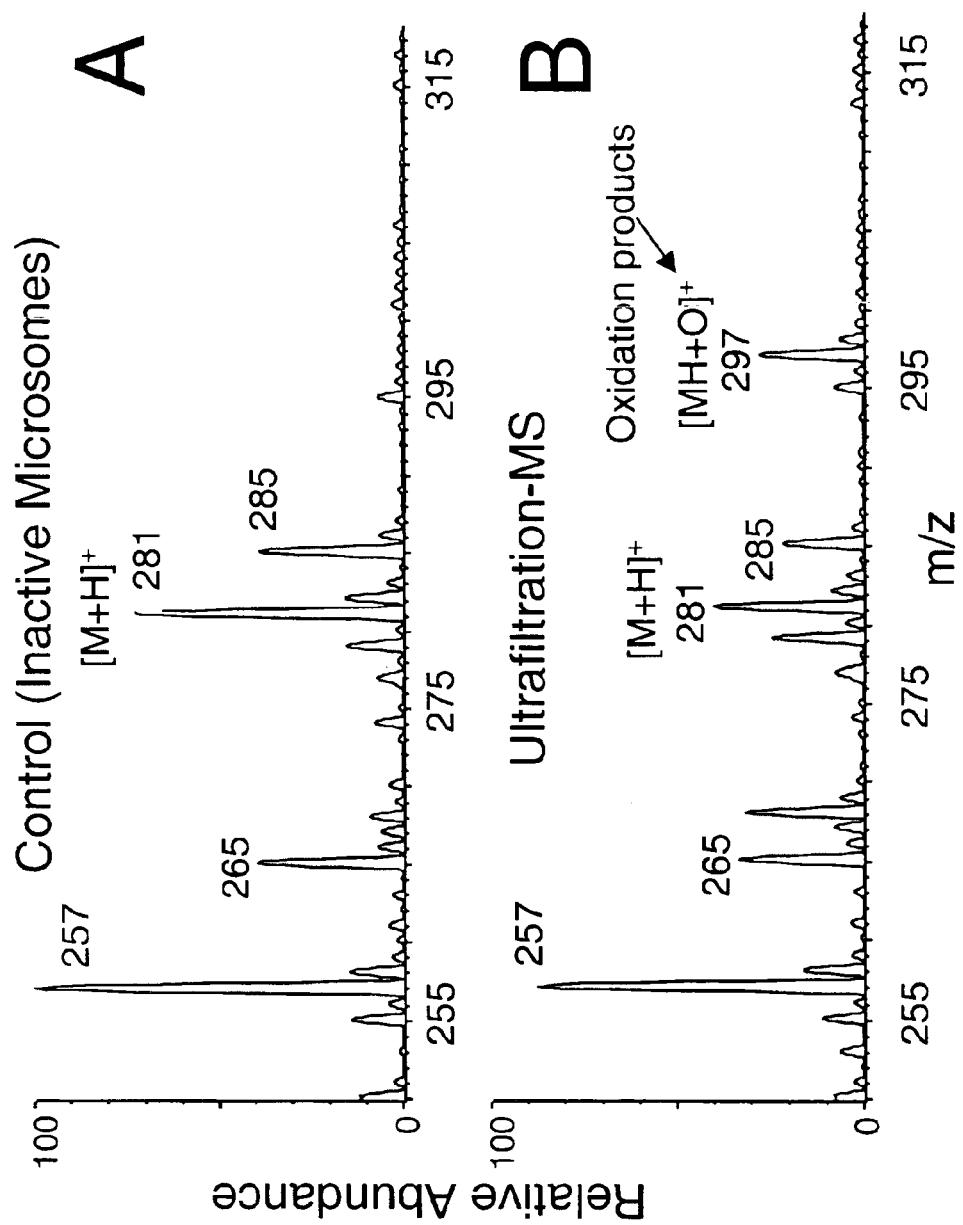
FIG. 5 shows results of high throughput pulsed ultrafiltration mass spectrometric screening obtained using the format described in FIG. 2.

High throughput pulsed ultrafiltration mass spectrometric screening as shown in FIG. 5 was obtained using the 20 analyses per hour format disclosed for FIG. 2. The ultrafiltration chamber contained rat liver microsomes. Imipramine and NADPH were coinjected through the chamber, and on-line mass spectrometric detection was used for only 2 minutes. Metabolism of imipramine by rat liver microsomes was demonstrated by the appearance of monoxygenated imipramine at m/z 297. Mass spectrometric analysis for 2 minutes of effluent from the parallel control incubation (containing NADPH inactive microsomes) showed no metabolites of imipramine.

Computer-reconstructed mass chromatograms of the positive ion electrospray reversed phase LC-MS analyses of the major imipramine metabolites, which were formed by 1) incubation of imipramine with rat liver cytochromes P450 during pulsed ultrafiltration, 2) collection of the effluent containing the metabolites, and 3) reinjection onto the LC-MS are shown in FIG. 6. Tandem mass spectra of each of the isomeric peaks of m/z 297 are summarized in Table 1.

Results of screening for formation of glutathione adducts as indicators of toxic (electrophilic) metabolites using pulsed ultrafiltration-mass spectrometry are shown in FIG. 7. In this embodiment, the chamber was loaded with rat liver microsomes (1 mg/mL protein) containing cytochromes P450 and microsomal glutathione S-transferase. The substrate, butyldimethyl phenol was injected along with NADPH and glutathione as cofactors. The formation of metabolites was monitored by using negative ion electrospray mass spectrometry. Oxidation of butyldimethyl phenol by cytochromes P450 produced a reactive quinone methide intermediate which either reacted with water to form the oxidation product detected at m/z 193, or reacted with glutathione to form the adduct detected at m/z 482. As expected, glutathione adducts were observed only in embodiments containing both glutathione and NADPH.

A schematic diagram of the pulsed ultrafiltration-mass spectrometry system is shown in FIGS. 1A and B. The ultrafiltration chamber is built out of a solvent resistant polymer with low protein and drug binding properties for example, the polymer polyetheretherketone (PEEK) and contains a Teflon-coated magnetic stirring bar and a Teflon or Viton O-ring, which forms a seal around the ultrafiltration membrane. The surface area of the ultrafiltration membrane should be as large as possible to reduce back pressure that might rupture the ultrafiltration membrane and to allow for high flow rates through the chamber (up to 100 μL/min). Flow rates may be a low as desired for enzyme reaction or cell permeation (i.e., 1 μL/min) to take place, or up to a maximum value of 100 μL/min for 10,000 molecular weight cutoff (MWCO) membranes or even 1 mL/min for membranes with pore size $\geq$100,000 MWCO. Also, the ultrafiltration chamber should have a small volume compared to the large surface area of the ultrafiltration membrane. Therefore, the ultrafiltration chamber is shallow but wide, and the ultrafiltration membrane covers the exit side of the wide face of the chamber. (FIG. 1B). Volumes of, e.g. ($\leq$1 mL) minimize the amount of enzymes and substrates required per experiment, thereby reducing costs, which is particularly useful when enzymes and substrates are difficult to obtain in larger quantities. A prototype chamber (FIG. 1B) had an internal volume of about 1 mL, and the surface area of the ultrafiltration membrane (which covered the exit side (FIG. 1B) of the chamber) was about 380 mm$^2$. The ultrafiltration chamber is preferably stirred to rapidly mix substrates and enzymes and to prevent build up of enzymes (or microsomes or cells 9) on the underside of the ultrafiltration membrane. A commercially available methylcellulose ultrafiltration membrane is suitable (i.e., Amicon; Beverly, Mass.), and the molecular weight cut-off of the membrane must be small enough to prevent the metabolizing enzymes from leaving the first chamber, but large enough to allow the xenobiotic compounds under study and their metabolites to pass through to form a second solution. For example, the enzyme adenosine deaminase may be trapped in the first chamber using an ultrafiltration membrane with a molecular weight cut-off of 10,000, liver microsomes may be trapped in the first chamber using an ultrafiltration membrane with a molecular weight cut-off of 100,000, and cells may be trapped in the first chamber using an ultrafiltration membrane with a MWCO of 10,000 or 1 million. Standard chromatography tubing and fittings made from polyetheretherketone (PEEK) are suitable to connect the HPLC pump, injector, ultrafiltration chamber, and mass spectrometer.

After the chamber is fitted with an ultrafiltration membrane of the appropriate molecular weight cut-off, biological material is loaded into the chamber using an HPLC injector. Suitable material includes cells, enzymes, microsomes or other material. The biological material may consist of enzymes, cells, microsomes, tissue homogenate, tissue slices, RNA, DNA or other macromolecules. A constant flow of buffer (i.e., 50–100 μL/min) at the appropriate pH for enzymatic activity (usually pH 7.4) is maintained through the chamber. For on-line mass spectrometric detection, the buffer should be volatile (i.e., ammonium acetate buffer) in order to minimize contamination of the mass spectrometer ion source. However, non-volatile buffers may be used if a desalting column is used between the ultrafiltration chamber and the mass spectrometer, or if a salt-resistant LC-MS interface is used such as the Z-spray™ interface (Micromass, Manchester, UK). Next, a xenobiotic compound (or mixture of compounds) is flow-injected into an ultrafiltration chamber using the HPLC injector. Cofactors, such as NADPH for cytochrome P450 oxidation, UDPGA for glucuronidation by UDP-glucuronyltransferases, or glutathione for glutathione-S-transferases, are injected along with the compound(s) under study or added to the continuously flowing buffer solution. Combinations of enzymes and cofactors may be used simultaneously in the ultrafiltration chamber to investigate complex metabolism pathways or to investigate bioavailability. For example, phase I oxidation by cytochromes P450 is often followed immediately in vivo by conjugation by phase II enzymes such as glucuronyltransferases or glutathione-S-transferases. In order to mimic such an in vivo system, both phase I and phase II enzyme systems may be included in an on-line pulsed ultrafiltration-mass spectrometry assay. As an alternative to purified enzymes, microsomes containing complex mixtures of enzymes such as liver microsomes may be used in the chamber. Living cells may be used in the chamber as well for studies of metabolism or bioavailability.

As metabolites are formed in the ultrafiltration chamber, they are separated from the enzymes and washed out of the chamber by the continuously flowing buffer solution. Metabolites may be detected, identified and quantified on-line using a mass spectrometer equipped with an appropriate LC-MS interface such as electrospray or atmospheric, pressure chemical ionization. Identification and quantification of metabolites using LC-MS is routine in the art of mass spectrometry. For additional characterization of metabolite mixtures, part of the effluent from the chamber may be collected for LC-MS or LC-MS-MS analysis. The addition of a chromatography step is necessary for the analysis of isomeric metabolites (i.e., metabolites with identical molecular weights). An aliquot of the effluent may be directly injected onto an HPLC column for LC-MS-MS analysis, or a short HPLC column may be used to concentrate and desalt a larger volume of effluent prior to LC-MS or LC-MS-MS analysis. Since the compound(s) 1 and their metabolites might be in low concentration in the second solution (i.e., the ultrafiltrate) and since the second solution will contain buffer salts, a trapping/desalting column may be used to concentrate the compound(s) 1 and their metabolites and at the same time remove the buffer. The desalted and concentrated extract may then be analyzed directly by mass spectrometry, LC-MS, or LC-MS-MS. (See Materials and Methods for more details.) Alternatively, the metabolites may be extracted from the effluent prior to analysis using LC-MS or LC-MS-MS.

Living cells may be used in the ultrafiltration chamber either as a source of enzymes for metabolism and other enzymatic assays, or for on-line bioavailability measurements. Because of the large size of cells compared to enzymes, much larger pore sizes may be used for the ultrafiltration membrane and molecular weight cutoffs of 500,000 or 1,000,000 daltons work well with low back pressure. The ultrafiltration chamber is preferably stirred in order to maintain the cells in suspension, otherwise the cells will adhere to the ultrafiltration membrane. For some types of assays, it may be desirable to have a layer of cells on the membrane. In order to maintain cell viability for several hours, the buffer must be isotonic with the cells, but it does not need to be isotonic with respect to sodium and potassium nor must the buffer contain cell nutrients. For longer experiments and experiments requiring intracellular cofactors such as NADPH or NADH, the buffer must function as a complete cell growth medium and should contain appropriate amounts of sodium and potassium to support cell survival. When cell growth medium is used as the flow-through buffer during pulsed ultrafiltration, the effluent from the chamber may be directed through an IAPLC column to extract and concentrate the desired compounds and remove the buffer salts and cell nutrients. Then, the desired compounds may be eluted directly into analyzer such as a mass spectrometer for identification and quantification.

Bioavailability assays are generally carried out in one of two ways. In one type of assay, the chamber is loaded with cells (i.e., Caco-2 human intestinal epithelial cells) such that the volume of the cells is significant compared to the volume of the chamber (e.g., 1 million cells/mL), and a size exclusion experiment is carried out. (Hidalgo, et al. 1989). An aliquot of a drug mixture is injected through the chamber and the elution profile is recorded by the mass spectrometer detector. The mixture may contain a single drug or a mixture of drugs under investigation and two internal controls: The negative control compound (such as mannitol) is excluded from entering the cells; and the positive control compound (such as certain steroids) readily enters the cells. Compounds that are excluded from the cells are washed out of the ultrafiltration chamber faster and are detected first, while compounds that enter the cells are distributed into a larger volume within the chamber and require longer to elute. In this manner, quantitative bioavailability or absorption data may be determined. In another type of bioavailability assay, a monolayer of cells (i.e., Caco-2 cells) is grown on an ultrafiltration membrane, which is then mounted in the ultrafiltration chamber with the cells facing the interior of the chamber. Then, compounds are injected through the chamber at a very low flow rate that does not disturb the integrity of the cell membranes. Compounds that readily enter and pass through the cells are detected first.

During the investigation of enzymatic reactions and metabolism, pulsed ultrafiltration-mass spectrometry facilitates 1) the determination of whether enzymatic products or metabolites of a xenobiotic compound (or compound mixture) are formed by a particular enzyme preparation, 2) the identification of the metabolites, and 3) quantitation of each product or metabolite and the amount of unchanged substrate. Measurement of the rate of disappearance of the substrate provides a measure of how extensively one compound is metabolized compared to another. Additional mass spectrometric analysis using pulsed ultrafiltration-tandem mass spectrometry or LC-MS-MS may be used for confirmation of the structures of each enzymatic product or metabolite. If metabolites are formed as a result of conjugation with glutathione, this indicates that electrophilic and potentially toxic intermediates were formed during metabolism. In this way, pulsed ultrafiltration-mass spectrometry may be used as a method for screening for the formation of toxic drug metabolites.

In order to increase the throughput of these pulsed ultrafiltration-mass spectrometric assays, mixtures of xenobiotic compounds may be injected simultaneously into the continuous stream flowing through the ultrafiltration chamber, and the metabolism or bioavailability of multiple compounds at a time may be investigated. For example, the throughput may be increased 10-fold by injecting mixtures containing 10 compounds at a time. The concentration of each compound must be kept low enough so that the enzyme(s) do not become saturated, or the cell receptors or other sites of entry into the cells do not become saturated. If saturation occurs, then the extent of metabolism will be reduced, the rates of metabolism of each compound will depend upon the ability of each substrate to compete for the enzyme active sites, or the rate of cellular uptake of each compound will depend upon the ability of each compound to compete for cell binding sites. Additional increases in throughput may be achieved by using multiple ultrafiltration chambers (up to for example, about 60 at a time) arranged in parallel with a single mass spectrometer. A schematic diagram of this high throughput pulsed ultrafiltration-mass spectrometry apparatus is shown in FIG. 2. By connecting each ultrafiltration chamber on-line to the mass spectrometer for only about 1 minute, efficient use of the mass spectrometric detector may be obtained with a throughput of up to 60 ultrafiltration experiments per hour. On-line ultrafiltration electrospray mass spectrometry offers a streamlined, high-throughput method for in vitro formation and mass spectrometric characterization of metabolites of xenobiotic compounds. The system is easily automated for high throughput screening to rapidly determine 1) if a compound is a substrate for a drug metabolizing enzyme or enzyme system, 2) how rapidly and extensively a compound is metabolized relative to other substrates, 3) if reactive (electrophilic) and potentially toxic metabolites are formed, 4) what are the structures of each metabolite, and finally, 5) what is the relative bioavailability of each compound.

EXAMPLES

The following examples are offered by way of illustration.

Example 1

Cytochrome P450 Metabolism and On-line Pulsed Ultrafiltration Mass Spectrometric Analysis of Chlorpromazine The on-line formation and detection of drug metabolites using pulsed ultrafiltration mass spectrometry is shown in FIG. 3 for the metabolism of the drug, chlorpromazine, by rat liver microsomal cytochrome P450. Chlorpromazine is an antidepressant-drug that undergoes extensive hepatic metabolism. (De Vane, 1995). The continuous mobile phase consisted of the volatile buffer, 50 mM ammonium acetate, pH 7.4, and cofactor, NADPH (0.1 mM) at a flow rate of 70 $\mu$L/min. Chlorpromazine (3 $\mu$g) in 50 $\mu$L, buffer was injected into the stirred ultrafiltration chamber (1 mL internal volume), which was equipped with a 100,000 molecular weight cut-off ultrafiltration membrane and rat liver microsomes (containing a total of 1 mg protein). Protonated molecules of chlorpromaziine, the cofactor NADPH, and the microsomal metabolic products were recorded continuously using positive ion electrospray mass spectrometry on a Hewlett-Packard (Palo Alto, Calif.) 5989B mass spectrometer. Electrospray mass spectrometry was used to identify all major metabolites, and the computer-reconstructed mass chromatograms of selected ions are shown in FIG. 3 to illustrate the appearance of the oxidized chlorpromazine metabolites, monitor the consumption of NADPH, and monitor the consumption of unreacted chlorpromazine. The area under the curve for unreacted chlorpromazine is proportional to the amount of chlorpromazine consumed during the on-line metabolism experiment. Also, the appearance of abundant metabolites, such as the oxidized chlorpromazine shown in FIG. 3, is evidence that chlorpromazine is extensively metabolized by hepatic cytochromes P450 and that this method may be used to identify metabolites or types of metabolites (such as oxidation products) and determine the extent of metabolism.

Example 2

Cytochrome P450 Metabolism and On-line Pulsed Ultrafiltration Mass Spectrometric Analysis of Pentoxyresorufin Pentoxyresorufin is a standard substrate used in the assay of cytochrome P450 2B-catalyzed O-dealkylation activity (Burke et al., 1985), and enzymatic O-dealkylation results in the loss of the pentoxy group to form resorufin. Pentoxyresorufin (1 μg) was injected into the ultrafiltration chamber containing hepatic microsomes as described herein. Negative ion electrospray mass spectrometry was used to monitor the appearance of resorufin, the O-dealkylated product, at m/z 212. The mass chromatograms for the elution of the metabolite resorufin and unreacted pentoxyresorufin are shown in FIG. 4. In this example, NADPH was injected simultaneously with substrate instead of being added to the mobile phase to produce a maximum concentration in the ultrafiltration chamber of 0.46 mM NADPH. This approach consumes less NADPH cofactor than the example shown in Example 1. If NADPH was not injected with the drug, no metabolism occurred as shown in the control profile of resorufin in FIG. 4. This example shows that other types of drug metabolites, such as dealkylation products, may be identified using this method. In this example and that of chlorpromazine in Example 1, liver microsomes were used from a rat that had not been treated with any compounds to induce cytochrome P450 activity. The on-line observation of metabolites formed using uninduced rat cytochromes P450 illustrates the great sensitivity of this method and indicates that uninduced human microsomes are a practical alternative.

Example 3

High Throughput Metabolic Screening

In order to achieve high throughput metabolic screening using ultrafiltration mass spectrometry, a scheme was devised utilizing multiple ultrafiltration chambers arranged in parallel with a single HPLC injector/autosampler and one mass spectrometer detector (See FIG. 2). High throughput is achieved by injecting each drug sample into a different ultrafiltration chamber in the parallel array and then recording mass spectra of the metabolite mixture eluting from each chamber at a fixed time post-injection. Constant flow of incubation buffer is maintained through all chambers, but only one chamber at a time is connected to the mass spectrometer. Mass spectra are recorded between 20–30 min. post-injection, which corresponds to elution of the maximum concentration of metabolites. If 60 chambers are used, up to 60 assay may be carried out per hr. Similarly, 20 screens per hr. would be possible using 20 chambers. After recording mass spectra of an incubation mixture, the chamber is rapidly flushed out to waste and then reloaded with microsomes for another assay.

Metabolism of imipramine, chlorpromazine, quinidine and naringenin was evaluated using the 20 analyses per hour format described in FIG. 2, and control assays were carried out using heat inactivated microsomes. For example, imipramine and cofactor-NADPH were injected simultaneously into a pulsed ultrafiltration chamber containing rat liver microsomes as described herein to give a maximum chamber concentration of 1.53 μg/mL (5.46 μM) imipramine and 0.46 mM NADPH. Similar injections were carried out for other compounds, but the effluent from each ultrafiltration chamber was connected on-line to the electrospray mass spectrometer for only 3 min. each, so that 20 analyses per hour could be carried out. FIG. 5 shows the mass spectra for the assay of imipramine obtained during these high throughput metabolic screening experiments. Formation of metabolites was determined by comparing a control incubation to an incubation with active microsomes. As expected, background ions, but no ions of metabolites were observed in the control experiments (See FIG. 5A). Metabolites of imipramine and chlorpromazine were observed (for example, see the ions of m/z 297 corresponding to monooxygenated imipramine in FIG. 5B), but no metabolites of naringenin or quinidine were detected. These assays indicate extensive metabolism by cytochromes P450 of imipramine and chlorpromazine, but not of naringenin and quinidine, and are consistent with the literature, which shows that chlorpromazine and imipramine are metabolized extensively, but naringenin and quinidine are not metabolized, and actually inhibit the action of certain cytochrome P450 isozymes (Gram, 1974; Lemoine et al., 1993; Brosen et al., 1991; Chiba et al., 1998; Guengerich et al., 1990; Sequeira and Strobel, 1995; Muralidharan et al., 1996). The high throughput analyses of the present invention may also be used quantitatively to assess the extent of metabolism by measuring the disappearance of drug during incubation compared to control incubations that use inactive microsomes or no NADPH cofactor.

Example 4

Pulsed Ultrafiltration-Liquid Chromatography-Mass Spectrometry and Pulsed Ultrafiltration-Mass Spectrometry-Mass Spectrometry Since metabolism of a drug can produce mixtures of isomeric products (i.e., 10-hydroxyimipramnine, 2-hydroxyimipramine, and imipramine N-oxide), and since molecular weight determination cannot distinguish between isomeric metabolites, a chromatographic step must be combined with pulsed ultrafiltration and tandem mass spectrometry to uniquely identify each isomeric metabolite. To illustrate the application of pulsed ultrafiltration-LC-MS-MS, imipramine metabolites were generated using rat liver microsomes and pulsed ultrafiltration as described in Example 2, except that the effluent from the ultrafiltration chamber was reinfected onto a reversed phase HPLC column for LC-MS and LC-MS-MS analysis. The major metabolites of cytochrome P450 oxidation of imipramine were N-desmethylimipramine and the isomeric monooxygenated species 10-hydroxyimipramine, 2-hydroxyimipramine and imipramine N-oxide as shown in the LC-MS analysis of the ultrafiltrate in FIG. 6. Each metabolite shown in FIG. 6 was identified based on its tandem mass spectrum (obtained during LC-MS-MS) as shown in Table 1.

Example 5

Toxicity Screening Using Ultrafiltration Mass Spectrometry

The pulsed ultrafiltration mass spectrometry system described in Examples 1 and 2 was used with rat liver microsomes and butyldimethyl phenol as the substrate. Coinjection with NADPH resulted in formation of a reactive metabolite, a quinone methide oxidation product of butyldimethyl phenol which may be detected after its reaction with water (FIG. 7). An advantage of this on-line metabolism-mass spectrometric detection system is the ability to detect and identify metabolites just seconds after they are formed. Because so little time elapses and no sample manipulation is necessary, some reactive (and potentially toxic) metabolites that might not be identified using any other method might be observed directly before they decompose. Alternatively, reactive metabolites may be trapped as phase II conjugates such as glutathione adducts. Coinjection of butyldimethyl phenol with NADPH and glutathione resulted in the formation of a quinone methide metabolite (a phase I oxidation reaction) followed by formation of a glutathione adduct (a phase II conjugation reaction) of the electrophilic metabolite with the nucleophilic glutathione. The glutathione product was detected on-line using pulsed ultrafiltration electrospray mass spectrometry (FIG. 7). The observation of glutathione adducts during pulsed ultrafiltration mass spectrometry indicates that reactive metabolites are formed by cytochrome P450 metabolism, and therefore, this assay system is appropriate for toxicity screening of drugs and other compounds.

Example 6

Pulsed Ultrafiltration-Liquid Chromatography-Mass Spectrometry and Pulsed Ultrafiltration-Mass Spectrometry-Mass Spectrometry for Analysis of Glutathione Adducts Glutathione adducts formed from reactive drugs or their activated metabolites in the ultrafiltrate may be trapped and concentrated on a trapping column and then analyzed using LC-MS or LC-MS-MS for identification of the metabolites and for the differentiation of isomeric products. This application is similar to Example 4, which describes the use of LC-MS and LC-MS-MS for the identification of isomeric metabolites of imipramine. In this case, the metabolism of 3-methylindole was investigated using pulsed ultrafiltration mass spectrometry as an example of formation and detection of adducts of a toxic, electrophilic imine methide intermediate (see Skiles et al. 1996 for additional information about the metabolism of 3-methylindole). Because several metabolites were formed, the eluate from the ultrafiltration chamber was trapped on a short HPLC column, concentrated and then eluted and analyzed using LC-MS-MS. Constant neutral loss MS-MS was used to selectively detect glutathione adducts by scanning for ions that fragment to eliminate a group weighing 129 D, which is characteristic of glutathione adducts (Ramanathan et al., 1998). Protonated molecules of m/z 437 corresponding to 3-methylindole-glutathione adducts were observed eluting at 16.0, 21.7 and 22.5 min. (see FIG. 8A). An unexpected adduct of m/z 452 was observed eluting at 15.6 min, which corresponded to both mono-oxygenation as well as glutathione attachment (FIG. 8B). This peak probably corresponds to addition of glutathione to 3-methylindole epoxide instead of an imine methide intermediate and is consistent with the recent observations of Skordos et al. (1998). Therefore, the application of constant neutral loss scanning for the presence of glutathione adducts was found to be useful for the detection of unexpected reactive and potentially toxic metabolites.

Example 7

High Throughput Toxicity Screening

Pulsed ultrafiltration mass spectrometric screening may be used on-line for high throughput detection of glutathione adducts for rapid toxicity screening of compounds or compound mixtures. The effluent from the ultrafiltration chamber needs to be monitored only long enough to obtain a tandem mass spectrum that would indicate the presence of glutathione adducts, if any were formed. In the example shown in FIG. 9, constant neutral loss mass spectrometry on a triple quadrupole mass spectrometer was used for 1 min. to detect the presence of a glutathione conjugate of butyldimethyl phenol. The metabolic activation of butyldimethyl phenol and reaction with glutathione are described in Example 5. If 60 ultrafiltration chambers were arranged in parallel as shown in FIG. 2, then 60 toxicity screening assays could be carried out per hour, since each chamber would be connected to the mass spectrometer for only one minute each. After each 1 min screening assay, the contents of a chamber would be washed out and then reloaded for a new screening assay 60 minutes later. This is an example of the use of ultrafiltration mass spectrometry for high throughput toxicity screening.

Example 8

Rapid Intestinal Transport Assay

An equimolar mixture of aspirin and propranolol were injected into a 1 mL ultrafiltration chamber containing approximately 5 million Caco-2 cells. The maximum concentration of each drug in the chamber was 118 $\mu$M. Isotonic phosphate buffered saline solution was pumped through the chamber at 50 $\mu$L/min into an absorbance detector selectively monitoring the elution of aspirin at 250 nm and propranolol at 290 nm. The elution profiles for both aspirin and propranolol are shown in FIG. 10. Following injection and mixing in the chamber, the rates of efflux of aspirin and propranolol from the ultrafiltration chamber containing the Caco-2 cells were measured and plotted on a graph of In [drug] vs. elution time (FIG. 11). The graphs in FIG. 11 show straight lines, and the ratio of the slopes of these lines represents the relative elution rates for aspirin and propranolol, aspirin/propranolol=1.6:1. (Note that the part of each curve selected for analysis corresponds to the elution profile beginning after mixing in the chamber has taken place, and therefore, represents the sum of efflux from the chamber and from the Caco-2 cells.) As expected, aspirin eluted from the chamber much faster than propranolol because it did not enter the Caco-2 cells as extensively as did propranolol. The elution of propranolol was delayed because it entered the Caco-2 cells and had a larger volume of distribution within the ultrafiltration chamber than did aspirin. After the experiment, the Caco-2 cells were removed from the chamber, stained with trypan blue and examined microscopically for integrity. The cells were found to be 95% intact.

This example illustrates that the application of pulsed ultrafiltration to the measurement of intestinal absorption and transport as part of determining bioavailability is based on sound chromatographic and biochemical principles. These data provide assurance that pulsed ultrafiltration may be applied to the rapid measurement of Caco-2 cell permeability by investigational new drugs and other xenobiotic compounds. Although the data shown in FIG. 10 and FIG. 11 were obtained using an absorbance detector, the relative uptake of multiple compounds by Caco-2 cells may be measured simultaneously without the need to rely on different absorbance maxima. Instead, mass spectrometry may be used for the simultaneous detection of multiple compounds if a volatile buffer is used instead of phosphate buffered saline.

TABLE 1

Tandem Mass Spectra of Cytochrome P450 Metabolites of Imipramine Obtained Using Positive Ion Electrospray Ionization and Collision Induced Dissociation

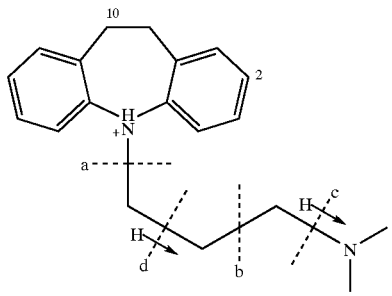

| Metabolite (Retention Time, min) | [M + H]+ | a[1] | b | c | d | other |
|---|---|---|---|---|---|---|
| Imipramine (49.7) | 281 | 86 (100) | 58 (23.0) | 236 (2.1) | 208 (3.0) | |
| Desmethylipramine (49.5) | 267 | 72 (100) | | 236 (2.6) | 208 (11.3) | 193 (1.0) |
| 2-Hydroxyimipramine (33.4) | 297 | 86 (100) | 58 (6.1) | 252 (1.7) | 224 (8.7) | 209 (0.9) |
| 10-Hydroxyimipramine (31.3) | 297 | 86 (100) | 58 (7.6) | $[252-H_2O]^+$ 234 (2.6) | $[224-H_2O]^+$ 206 (9.5) | $[MH-H_2O]^+$ 279 (3.8) |
| Imipramine N-oxide (50.1) | 297 | 102 (100) | | 236 (1.8) | 208 (3.7) | 72 (3.1) 84 (3.9) 86 (0.7) 195 (2.7) |

[1]Ion abundances (listed in parentheses) are normalized to the most abundant fragment ion in each set

MATERIALS AND METHODS

Hepatic Microsomal Incubations

Microsomes may be prepared from any types of cells or tissues, which are obtained from any species including humans. For the examples cited, male or female Sprague-Dawley rats (180–200 g) were obtained from Sasco Inc. (Omaha, Nebr.). Microsomes were prepared from rat liver, and protein and cytochrome P450 concentrations were determined using standard procedures (1). The microsomes were diluted (typically three-fold) with 50 mM ammonium acetate buffer at pH 7.4 immediately before use to make the protein concentration approximately 10 mg/mL. An aliquot of approximately 100 μL of the diluted microsomes was injected into the magnetically stirred ultrafiltration chamber, which had a volume of approximately 1 mL, so that the final concentration of microsomal protein was 1.0 mg/mL. Before being connected to the mass spectrometer, the microsomes were washed for 30 min at 70 μL/min with 50 mM ammonium acetate buffer at pH 7.4 to remove low molecular weight contaminants. This washing step may be accelerated by using a higher flow rate, but care should be taken to avoid excessive pressure and rupture of the ultrafiltration membrane.

The ultrafiltration chamber (FIG. 1B) was built in-house out of polyetheretherketone (PEEK) and contained a Teflon®-coated magnetic stirring bar and a Viton® O-ring, which formed a seal around the ultrafiltration membrane. The methylcellulose ultrafiltration membrane was purchased from Amicon (Beverly, Mass.) and had a molecular weight cut-off of 100,000. Ultrafiltration membranes with smaller pore sizes (i.e., 10,000 molecular weight cut-off) were investigated but could not be used without clogging. Chromatography tubing and fittings were made from polyetheretherketone (PEEK, Upchurch Scientific, Oak Harbor, Wash.).

NADPH and drug substrates were purchased from Sigma Chemical Company (St. Louis, Mo. All solvents were HPLC grade. Into a mobile phase consisting of 50 mM ammonium acetate, pH 7.4, and 0.1 mM NADPH at a flow rate of 70 μL/min, chlorpromazine (3 μg) in 50 μL buffer was injected into the ultrafiltration chamber. Protonated molecules of chlorpromazine, cofactor NADPH, and the microsomal metabolic products were recorded continuously using positive ion electrospray mass spectrometry. In another experiment, 1 μg of pentoxyresorufin was injected into the ultrafiltration chamber containing hepatic microsomes as described above. Negative ion electrospray mass spectrometry was used to monitor the appearance of resorufin, the O-dealkylated product, at m/z 212. In some experiments, NADPH was injected simultaneously with substrate instead of being added to the mobile phase. For example, imipramine, and cofactor NADPH were injected simultaneously to give a maximum chamber concentration of 1.53 μg/mL (5.46 μM) imipramine and 0.46 mM NADPH.

Typically, a wide mass range was scanned by the mass spectrometer in order to identify the major metabolites (if unknown). Once the major metabolites are known or if only the compounds injected into the first chamber need to be analyzed, selected ion monitoring mass spectrometry is used to follow the appearance of metabolites, monitor the consumption of NADPH, and/or monitor the profile of unreacted compound(s). Control experiments are typically carried without cofactor or with heat inactivated microsomes.

In order to investigate the potential for high throughput metabolic screening using pulsed ultrafiltration mass spectrometry, analyses of imipramine and pentoxyresorufin were carried out as described above, except that the ultrafiltration chamber was connected to the mass spectrometer for only 3 min per incubation during a period when a high concentration of metabolites and substrate elute (26–29 min after injection of the substrate). The transfer line between the ultrafiltration chamber and the mass spectrometer was flushed for 1 min, then mass spectra were recorded for 2 min.

Mass Spectrometry

An Applied Biosystems (Foster City, Calif.) 140A dual syringe pump with a Rheodyne 8125 injector was used for all analyses. Mass spectra were acquired using either a Micromass (Manchester, UK) Quattro II triple quadrupole mass spectrometer equipped with an electrospray ionization source, or a Hewlett-Packard (Palo Alto, Calif.) 5989B quadrupole mass spectrometer with an Analytica (Branford, Conn.) electrospray ion source. Both instruments were tuned to a peak width of 0.6 u over the entire mass range. During MS-MS, collision induced dissociation was carried out using a collision energy of 25 eV and argon collision gas pressure of 2.7 µbar. During single quadrupole scanning, the scan range was m/z 230–350 at 3 s/scan.

Liquid chromatography-mass spectrometry (LC-MS) and liquid chromatography-tandem mass spectrometry (LC-MS-MS) were carried out using a Hypersil (Hewlett Packard Co., Wilmington, Del.) BDS $C_{18}$ column (2×250 mm) with the triple quadrupole mass spectrometer as detector. The solvent system consisted of a gradient from 75% water (containing 0.5% acetic acid and adjusted to pH 3.5) to 70% methanol in 50 min and then to 90% methanol over an additional 10 min at a flow rate of 180 µL/min. The LC-MS analysis shown in FIG. 6 was carried out on an aliquot (1/20th of the total) of the ultrafiltrate from the ultrafiltration microsomal metabolism of imipramine. Table 1 shows a summary of tandem mass spectra of imipramine metabolites that were generated by cytochrome P450 metabolism during pulsed ultrafiltration. As summarized in Table 1, tandem mass spectrometric analysis of the various imipramine metabolites facilitated the determination or metabolite structures such as the localization of hydroxyl groups or site of demethylation. For example, only the 10-hydroxyimipramine metabolite eliminated water during collision induced dissociation, so that this metabolite was easily distinguished from 2-hydroxyimipramine or imipramine N-oxide.

DOCUMENTS CITED

Brosen, K., Zeugin, T. and Meyer, U.A.: Role of P450IID6, the target of the sparteine-debrisoquin oxidation polymorphism, in the metabolism of imipramine. *Clin. Pharmacol. Ther.* 49, 609–617 (199 1).

Burke, M.D., Thompson, S., Elcombe, C.R., Halpert, J., Haaparanta, T. and Mayer, R.T. Ethoxy-, pentoxy-, and benzyloxyphenoxazones and homologues: A series of substrates to distinguish between different induced cytochromes P450. *Biochem. Pharmacol.* 34, 3337–3347 (1985).

Chiba, M., Fujita, S. and Suzuki, T.: Parallel pathway interactions in imipramine metabolism in rats. *J Pharm. Sci.* 77:944–947 (1988).

DeVane, C.L.: Brief comparison of the pharmacokinetics and pharmacodynamics of the traditional and newer antipsychotic drugs. *Am. J Health Syst. Pharm.* 52:S15–S18 (1995).

Gordon, E.M., Gallop, M.A. and Patel, D.V.: Strategy and tactics in combinatorial organic synthesis. Application to drug discovery. *Acc. Chem. Res.* 29:144–154 (1996).

Gram, L.F.: Metabolism of tricyclic antidepressants. *Dan. Med. Bull.* 21:218–231 (1974).

Guengerich, F.P., Kim, D.H.: In vitro inhibition of dihydropyridine oxidation and aflatoxin B 1 activation in human liver microsomes by naringenin and other flavonoids. *Carcinogenesis* 11:2275–2279 (1990).

Hidalgo I.J., Raub, T.J., Borchardt, R.T. (1989) Characterization of the human colon carcinoma cell line (Caco-2) as a model system for intestinal epithelial permeability. *Gastroenterology* 96:736–749.

Lemoine, A., Gautier, J.C., Azoulay, D., Kiffel, L., Belloc, C., Guengerich, F.P., Maurel, P., Beaune, P. and Leroux, J.P.: Major pathway of imipramine metabolism is catalyzed by cytochromes P450 1A2 and P450 3A4 in human liver. *Mol. Pharmacol.* 43:827–832 (1993).

Loo, J.A.: Mass spectrometry in the combinatorial chemistry revolution. *Eur. Mass Spectrom.* 3:93–104 (1997).

Maurel, P.: The use of adult human hepatocytes in primary culture and other in vitro systems to investigate drug metabolism in man. *Adv. Drug Delivery Rev.* 22:105–132 (1996).

Muralidharan, G., Cooper, J.K., Hawes, E.M., Korchincki, E.D. and Midha, K.K.: Quinidine inhibits 7-hydroxylation of chlorpromazine in extensive metabolisers, of debrisoquine. *Eur. J Clin. Pharmacol.* 50:121–128 (1996).

Parkinson, A.: An overview of current cytochrome P450 technology for assessing the safety and efficacy of new materials. *Toxicol. Pathol.* 24:45–57 (1996).

Ramanathan, R., Cao, K, Cavalieri, E. and Gross, M.: Mass spectrometric methods for distinguishing structural isomers of glutahione conjugates of estrone and estradiol. *J. Am. Soc. Mass Spectrom.* 9:612–619.

Sequeira, D.J., Strobel, H.W.: High-performance liquid chromatographic method for the analysis of imipramine metabolism in vitro by liver and brain microsomes. *J. Chromatogr. B.* 673:251–258 (1995).

Skiles, G.L. and Yost, G.S.: Mechanistic studies on the cytochrome P450-catalyzed hydrogenation of 3-methylindole. *Chem. Res. Toxicol.* 8:291–297 (1996).

Thompson, J.A., A.M. Malkinson, M.D. Wand, S.L. Mastovich, E.W. Mead, K.M. Schullek and W.G. Laudenschlager: Oxidative-metabolism of butylated hydroxytoluene by hepatic and pulmonary microsomes from rats and mice. *Drug Metab. Dispos.*, 15, 833–840 (1987).

Thompson, L.A. and Ellman, J.A.: Synthesis and applications of small molecule libraries. *Chem. Rev.* 29:132–143 (1996).

Van Breemen, R.B., Nikolic, D. and Bolton, J.L.: Metabolic screening using an on-line ultrafiltration mass spectrometry. *Drug Metabolism and Disposition* 26:85–90 (1998).

We claim:

1. A high throughput method for determining whether a known compound or a mixture of compounds is suitable for intended use as a drug, said method comprising:

(a) placing a first solution comprising biological material having higher molecular weights than the compound or the mixture of compounds, into an ultrafiltration chamber, said chamber comprising a membrane with pore sizes that will not allow passage of the biological material out of the chamber;

(b) placing the compound or the mixture of compounds into the ultrafiltration chamber, said chamber comprising a membrane with pore sizes that allow passage of the compound or the mixture of compounds out of the chamber;

(c) providing a continuous flow of a supportive solution to the ultrafiltration chamber that facilitates reactions between the biological material and the compound or the mixture mixtures of compounds to produce products of the reactions that are different from the compound or mixture of compounds in function or structure or both function and structure, wherein the ultrafiltration chamber allows passage of the products out of the chamber to form a second solution, but does not allow passage of the biological materials;

(d) analyzing the second solution comprising the products of the reactions between the biological material and the compound or the mixture of compounds, to determine whether the compound or any of the mixture of compounds is suitable for use as a drug by analyzing the products in the second solution.

2. The method of claim 1, wherein the biological material is selected from a group consisting of a protein, a peptide, an oligonucleotide, an oligosaccharide, a microsome, a cell, a tissue, an enzyme, DNA and RNA.

3. The method of claim 1, wherein the compound or mixture of compounds is selected from the group consisting of combinatorial library, a drug, a drug mixture, a xenobiotic compound, a mixture of xenobiotic compounds, an endogenous compound, a mixture of natural products, and a mixture of endogenous compounds.

4. The method of claim 1, wherein the supportive solution is selected from a group consisting of a buffer, a nutrient medium, or a combination thereof, said supportive solution maintaining the biological material in a state wherein the biological material reacts with a compound or mixture of compounds in the sample.

5. The method of claim 4, wherein the supportive solution facilitates the reactions of the biological material with the first solution and facilitates the removal of the compound compounds, or the mixture of compounds and products of the reactions between the compound or the mixture of compounds and the biological material, by washing them through the ultrafiltration chamber into the second solution.

6. The method of claim 1, wherein the compound or the mixture of compounds is added by means of injection.

7. The method of claim 1, wherein suitable conditions for reactions between the biological material in the first solution with the compound or the mixture of compounds, comprises mixing the sample with the biological material to achieve a homogeneous distribution of sample, controlling temperature to maintain function of the biological material, providing adequate concentration of sample and sufficient amount of biological material to facilitate analysis, providing sufficient time for interaction, and controlling atmospheric gases to maintain function of the biological material.

8. The method of claim 1, wherein the analyzing of the second solution is by mass spectrometry.

9. The method of claim 1, wherein the products of the reactions comprise metabolites, glutathione adducts, and small molecules to determine cellular absorption.

10. The method of claim 1, wherein multiple chambers with ultrafiltration membranes are arranged in parallel with a single mass spectrometer for step d.

11. A kit for analyzing a compound or a mixture of compounds to determine if a compound or any of the mixture of compounds are suitable for use as a drug or natural product, by analyzing reaction products between biological material and the compound or the mixture of compounds, said kit comprising in separate containers, (a) an ultrafiltration membrane with pore sizes that allow passage of the compound or mixture of compounds and reaction products, but not passage of the biological material, (b) a first solution containing the biological material, and (c) standards against which to compare analysis of the products of reactions between the first solution and the compounds or mixture of compounds to determine suitability as a drug or natural product.

12. The method of claim 9, wherein concentrations of the small molecules determine cellular permeability or absorption.

* * * * *